US011269171B2

(12) United States Patent
Dixon

(10) Patent No.: US 11,269,171 B2
(45) Date of Patent: Mar. 8, 2022

(54) SPECTRALLY-RESOLVED SCANNING MICROSCOPE

(71) Applicant: Huron Technologies International Inc., St. Jacobs (CA)

(72) Inventor: Arthur Edward Dixon, Waterloo (CA)

(73) Assignee: Huron Technologies International Inc.

(*) Notice: Subject to any disclaimer, the term of this patent is extended or adjusted under 35 U.S.C. 154(b) by 391 days.

(21) Appl. No.: 16/066,354

(22) PCT Filed: May 19, 2017

(86) PCT No.: PCT/CA2017/000132
§ 371 (c)(1),
(2) Date: Jun. 27, 2018

(87) PCT Pub. No.: WO2017/197491
PCT Pub. Date: Nov. 23, 2017

(65) Prior Publication Data
US 2019/0018231 A1 Jan. 17, 2019

Related U.S. Application Data

(60) Provisional application No. 62/338,660, filed on May 19, 2016.

(51) Int. Cl.
*G02B 21/16* (2006.01)
*G02B 21/00* (2006.01)
(Continued)

(52) U.S. Cl.
CPC ............ *G02B 21/16* (2013.01); *G02B 5/201* (2013.01); *G02B 21/002* (2013.01);
(Continued)

(58) Field of Classification Search
CPC .. G02B 21/16; G02B 21/002; G02B 21/0036; G02B 21/26; G02B 21/365; G02B 5/201; G02B 21/367; G02B 21/008; G02B 21/36; G02B 21/06; G02B 21/0032; G02B 21/34; G02B 21/0076; G01N 21/6452;
(Continued)

(56) References Cited

U.S. PATENT DOCUMENTS 7,218,446 B2 * 5/2007 Dixon ................ G02B 21/0024
359/368
2013/0342674 A1 * 12/2013 Dixon .................... G02B 21/36
348/79
(Continued)

*Primary Examiner* — Stephone B Allen
*Assistant Examiner* — Rahman Abdur
(74) *Attorney, Agent, or Firm* — David J. Schnurr

(57) ABSTRACT

A scanning microscope and method of operation has a scan filter with a repeat pattern of a plurality of rows that is repeated at least across an active area of an entire surface of an area detector. Each row is covered by a bandpass filter or an emission filter for a specific fluorophore or filters of a particular colour for each row. The scanning microscope can be used to obtain one or more of hyperspectral images, multispectral images, RGB images, RGBW images, W images and Single Field Of View images of a specimen using Moving Specimen Image Averaging. A method of obtaining one or more of the images is also described.

14 Claims, 28 Drawing Sheets

Hyperspectral MSIA scanner

(51) Int. Cl.
*G02B 21/26* (2006.01)
*G02B 21/36* (2006.01)
*G02B 5/20* (2006.01)

(52) U.S. Cl.
CPC ......... *G02B 21/0036* (2013.01); *G02B 21/26* (2013.01); *G02B 21/365* (2013.01)

(58) Field of Classification Search
CPC .... G01N 21/6458; G01N 21/65; G01N 21/64; G01N 21/6456; G01J 3/0297; G01J 3/02; G01J 3/2803; G01J 3/2823; H04N 5/332; H04N 5/232945; G06K 9/00127
USPC .................................. 349/106; 359/891, 385
See application file for complete search history.

(56) References Cited

U.S. PATENT DOCUMENTS

| | | | | |
|---|---|---|---|---|
| 2015/0267251 A1* | 9/2015 | Cai | ........................ | G02B 21/06 506/9 |
| 2016/0062098 A1* | 3/2016 | Brown | ............... | G01N 21/6458 348/80 |

* cited by examiner

Fig. 1  Scan filter for Hyperspectral Imaging

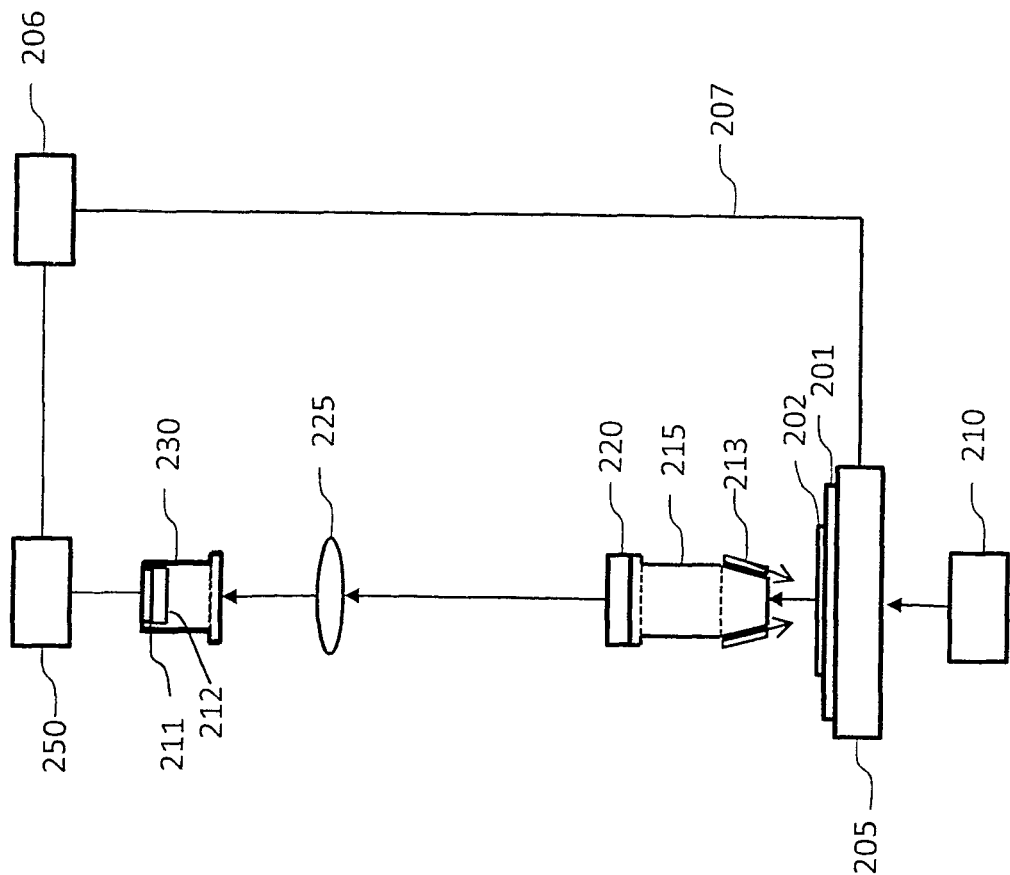
Fig. 2 Hyperspectral MSIA scanner

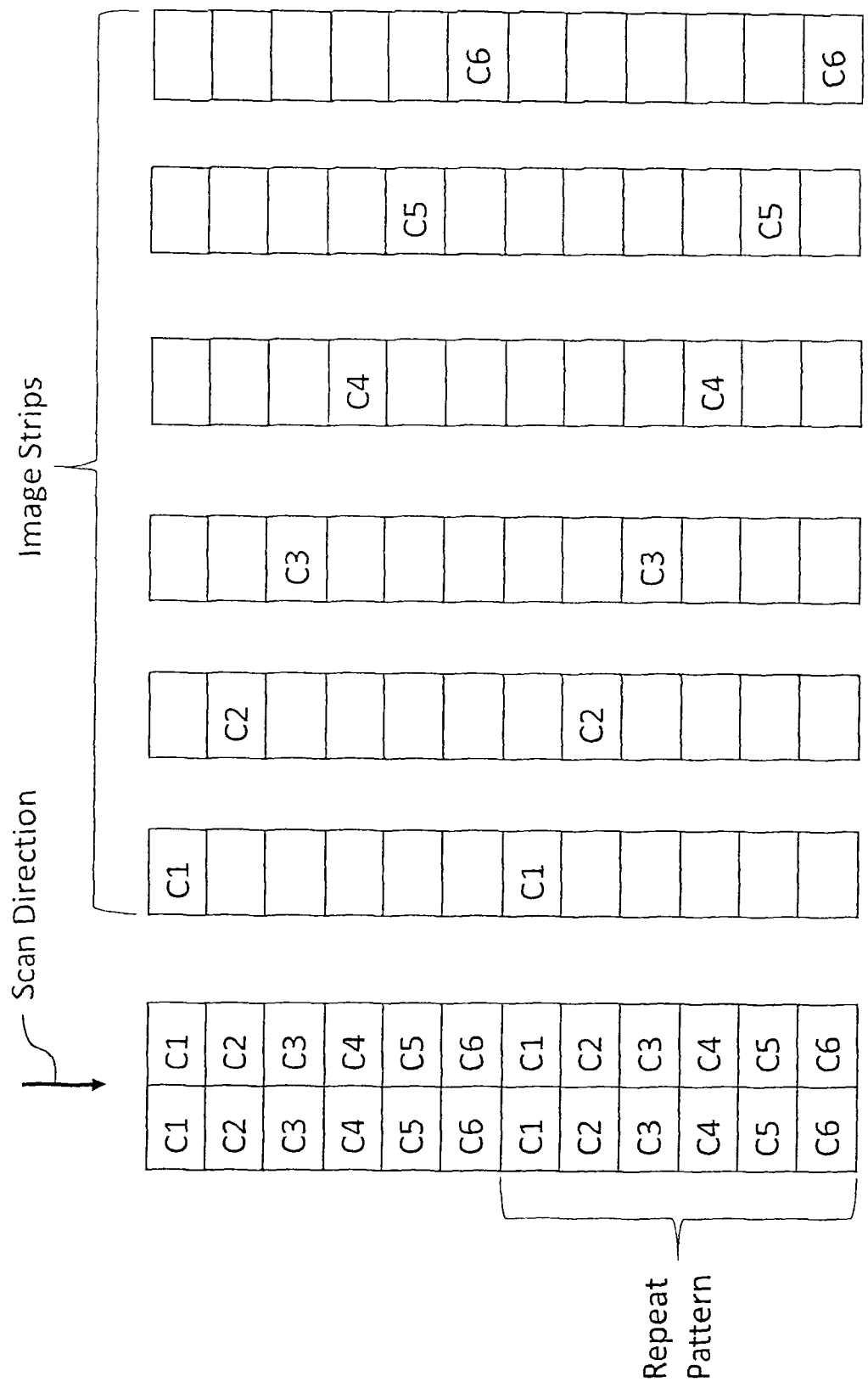
Figure 4A MSIA scan image frame and strips, first exposure

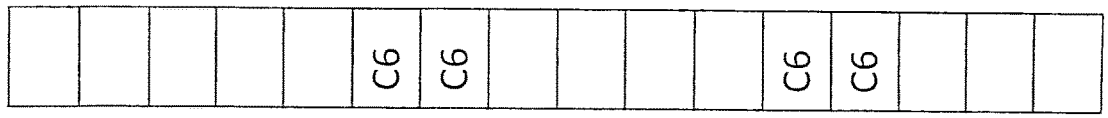
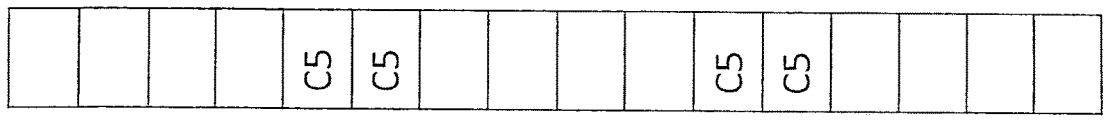
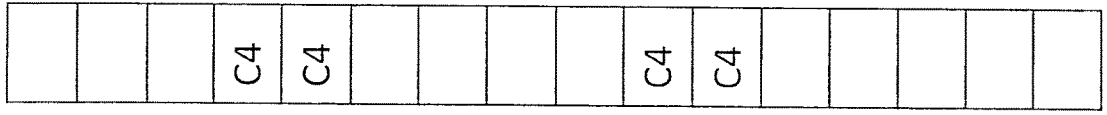
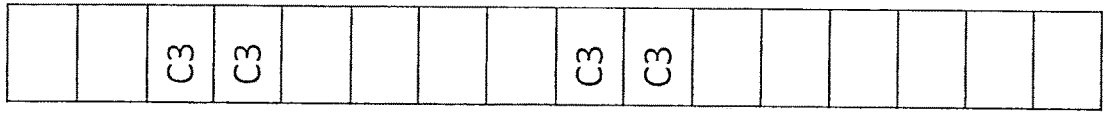
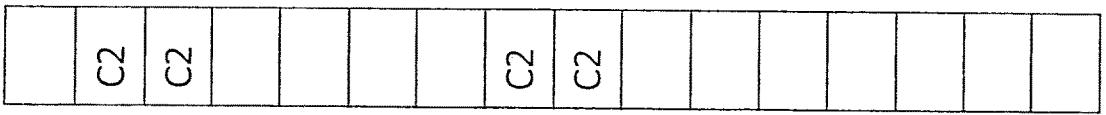
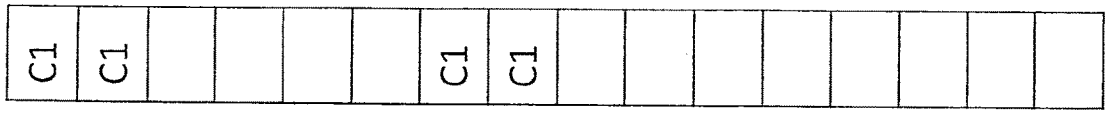
Figure 4B MSIA scan image frame and strips, second exposure

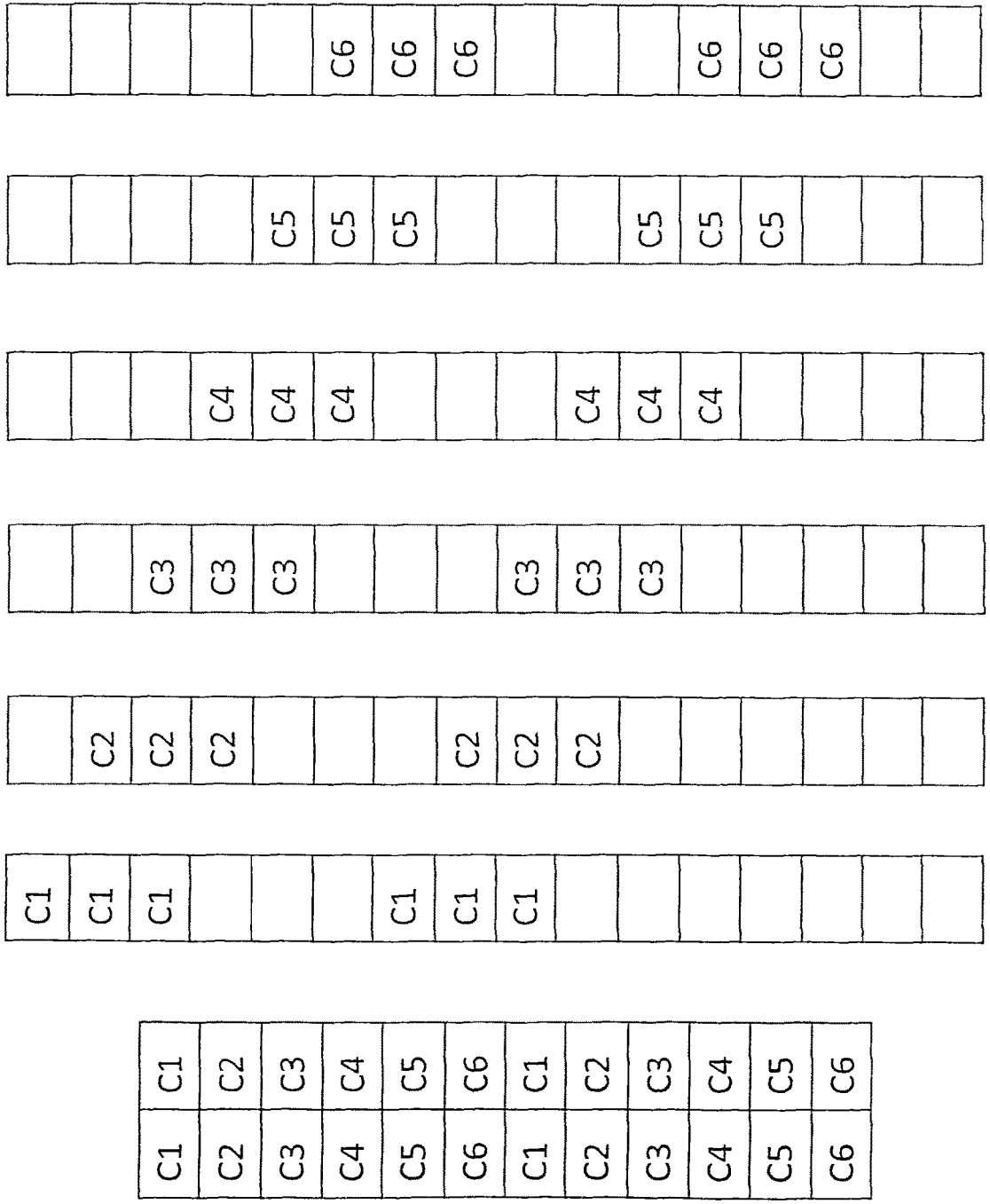
Figure 4C MSIA scan image frame and strips, third exposure

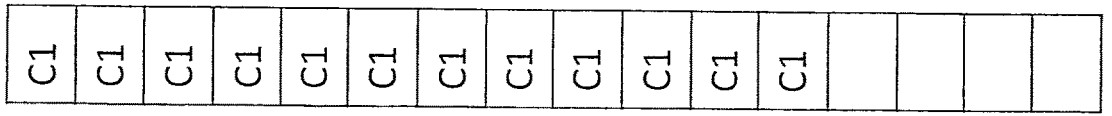
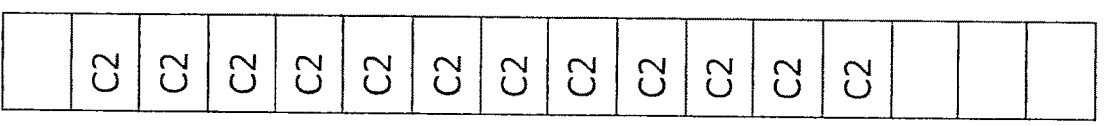
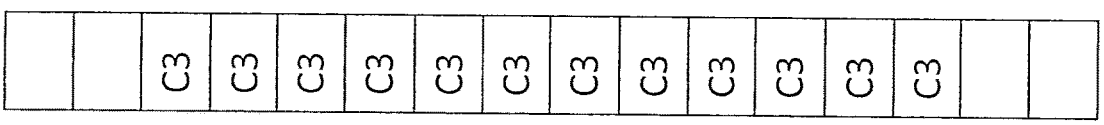
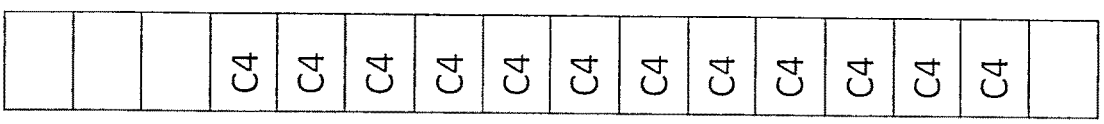
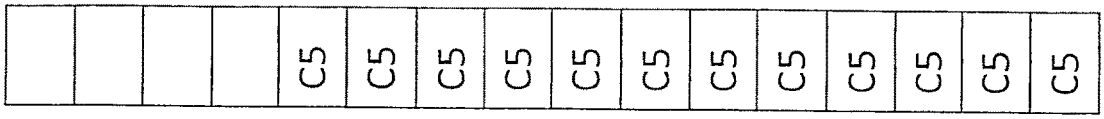
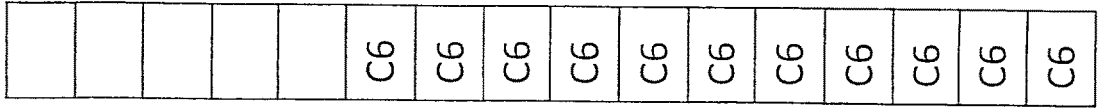
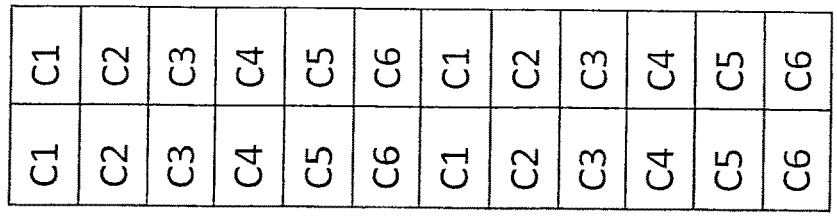
Figure 4D  MSIA scan image frame and strips, sixth exposure

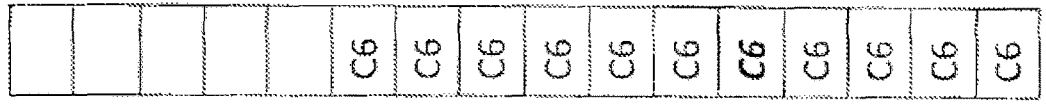
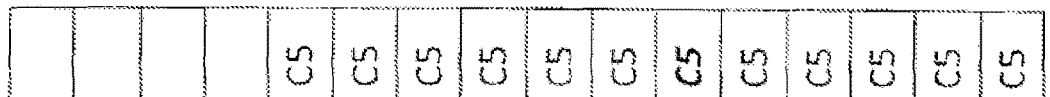
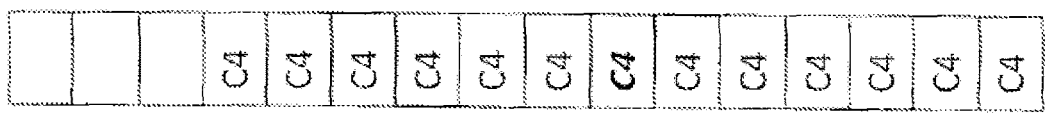
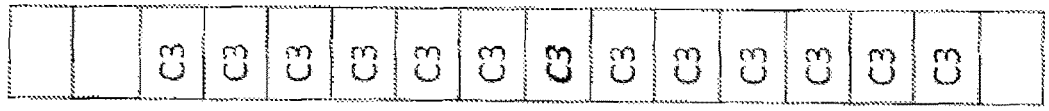
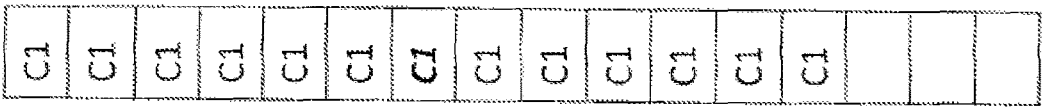
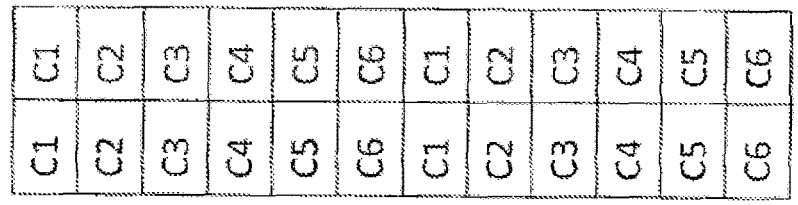
Figure 4E MSIA scan image frame and strips, seventh exposure Figure 4F MSIA scan image frame and strips, eighth exposure Figure 4G MSIA scan image frame and strips, twelfth exposure Figure 5 Scan filter for multispectral imaging (Five fluorophores)

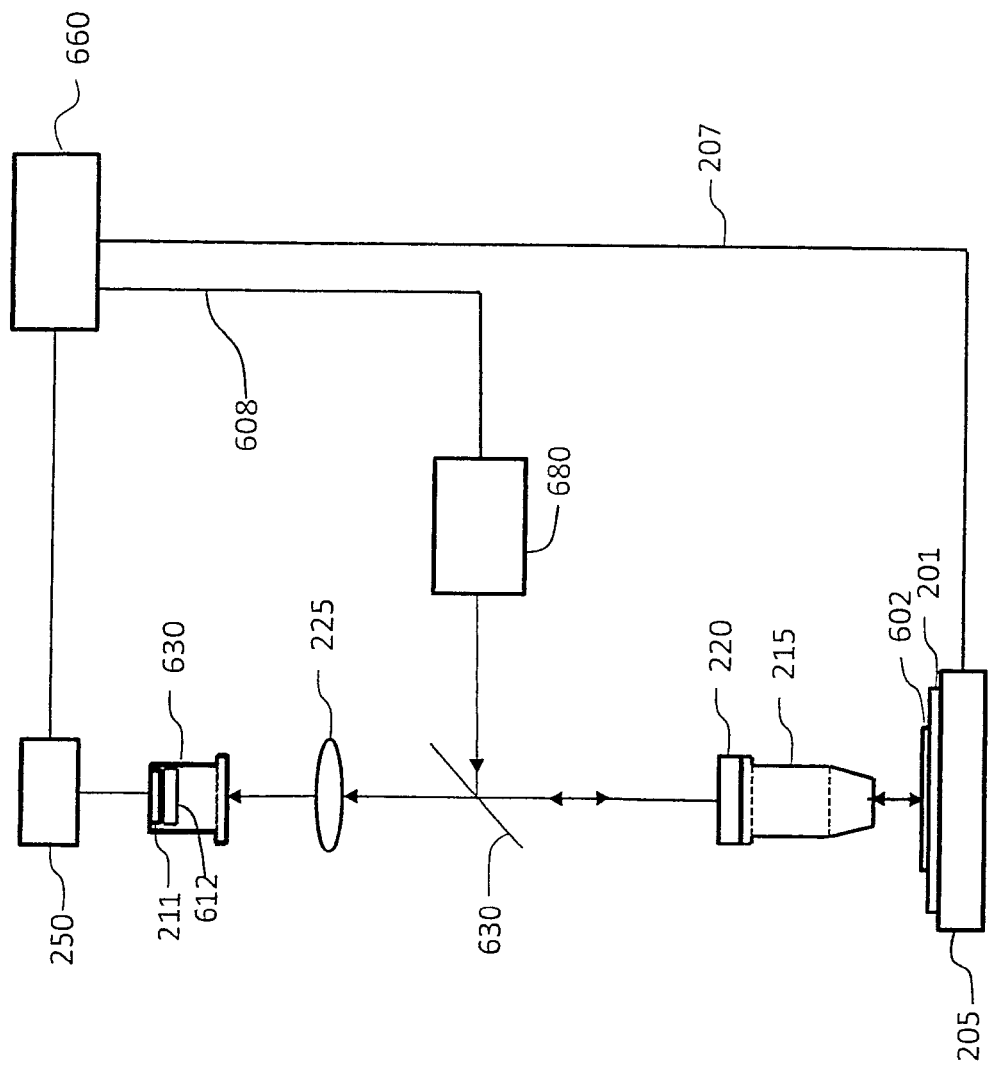
Fig. 6 Fluorescence MSIA Scanner using Multispectral Fluorescence Scan Detector

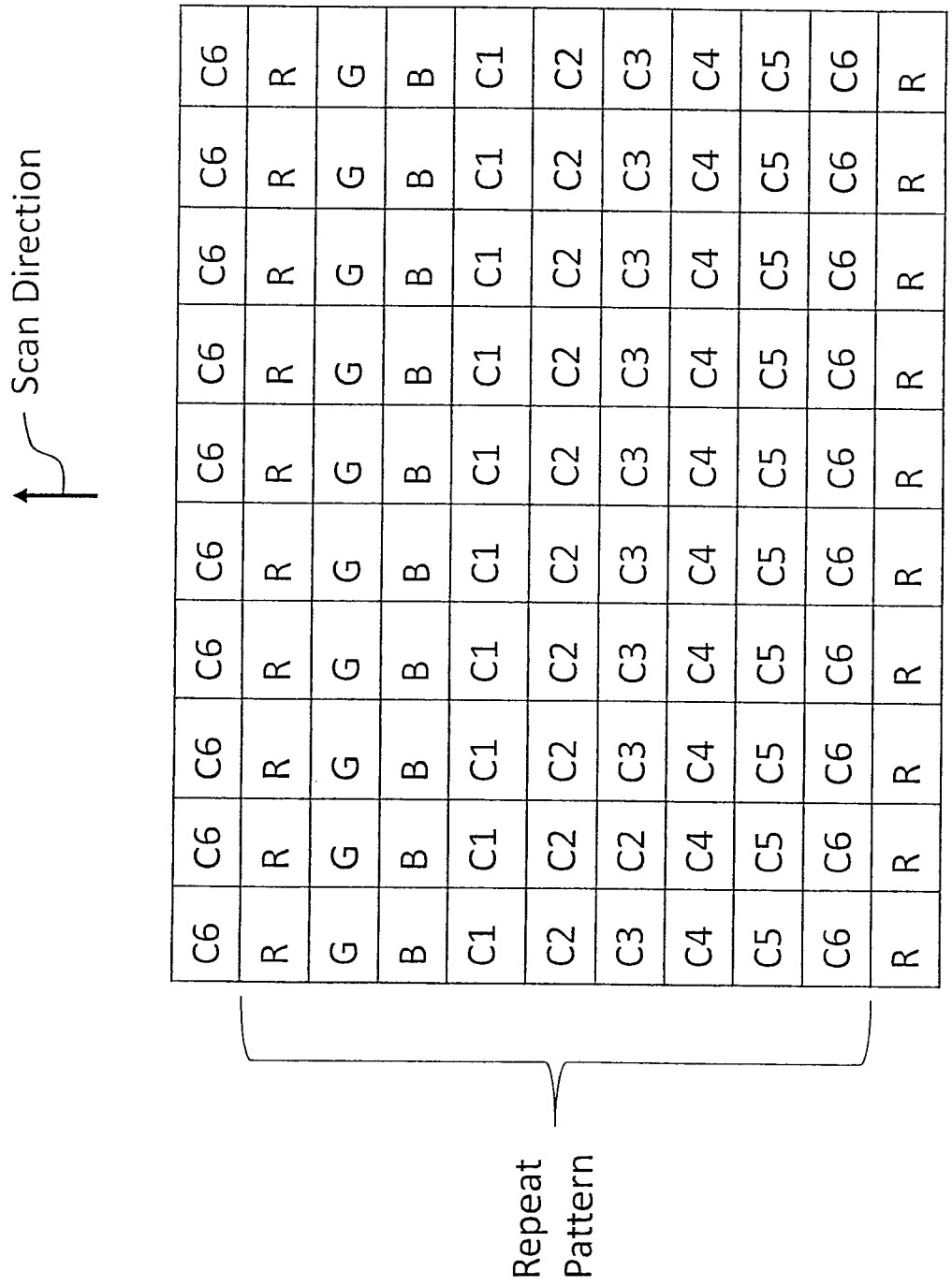
Fig. 7. Scan filter for combined RGB and Hyperspectral Imaging

| F5 | W | R | G | B | F1 | F2 | F3 | F4 | F5 | W |
|----|---|---|---|---|----|----|----|----|----|---|
| F5 | W | R | G | B | F1 | F2 | F3 | F4 | F5 | W |
| F5 | W | R | G | B | F1 | F2 | F3 | F4 | F5 | W |
| F5 | W | R | G | B | F1 | F2 | F3 | F4 | F5 | W |
| F5 | W | R | G | B | F1 | F2 | F3 | F4 | F5 | W |
| F5 | W | R | G | B | F1 | F2 | F3 | F4 | F5 | W |
| F5 | W | R | G | B | F1 | F2 | F3 | F4 | F5 | W |
| F5 | W | R | G | B | F1 | F2 | F3 | F4 | F5 | W |
| F5 | W | R | G | B | F1 | F2 | F3 | F4 | F5 | W |
| F5 | W | R | G | B | F1 | F2 | F3 | F4 | F5 | W |

← Scan Direction

Repeat Pattern

Figure 8 Scan filter for RGBW and Five fluorophores

Fig. 9 Scan filter that enables binning

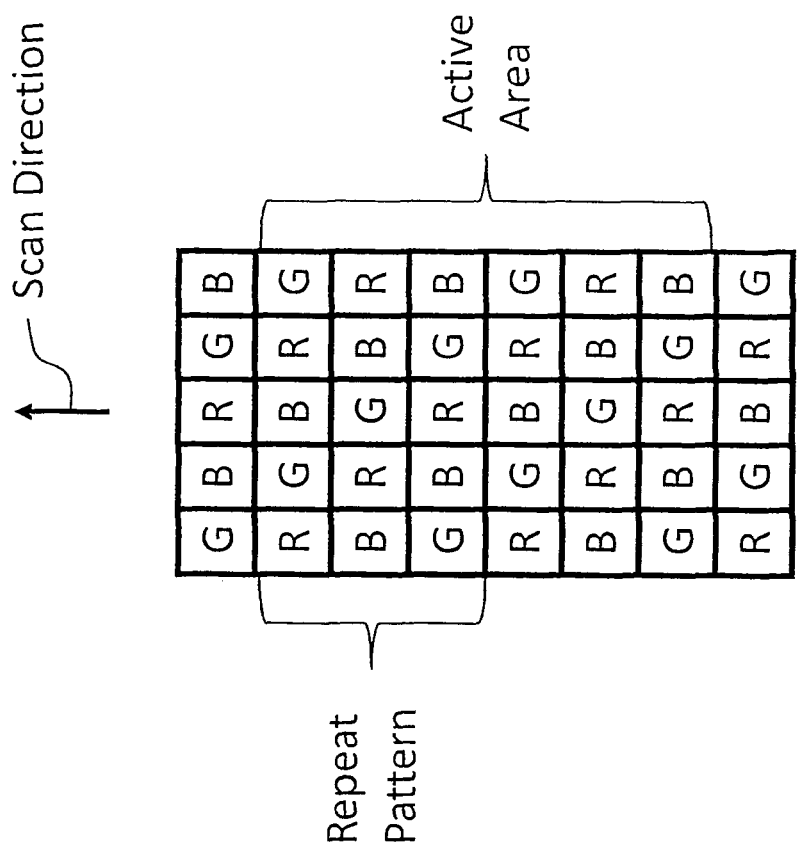
Fig. 10 Diagonal Format Scan Filter

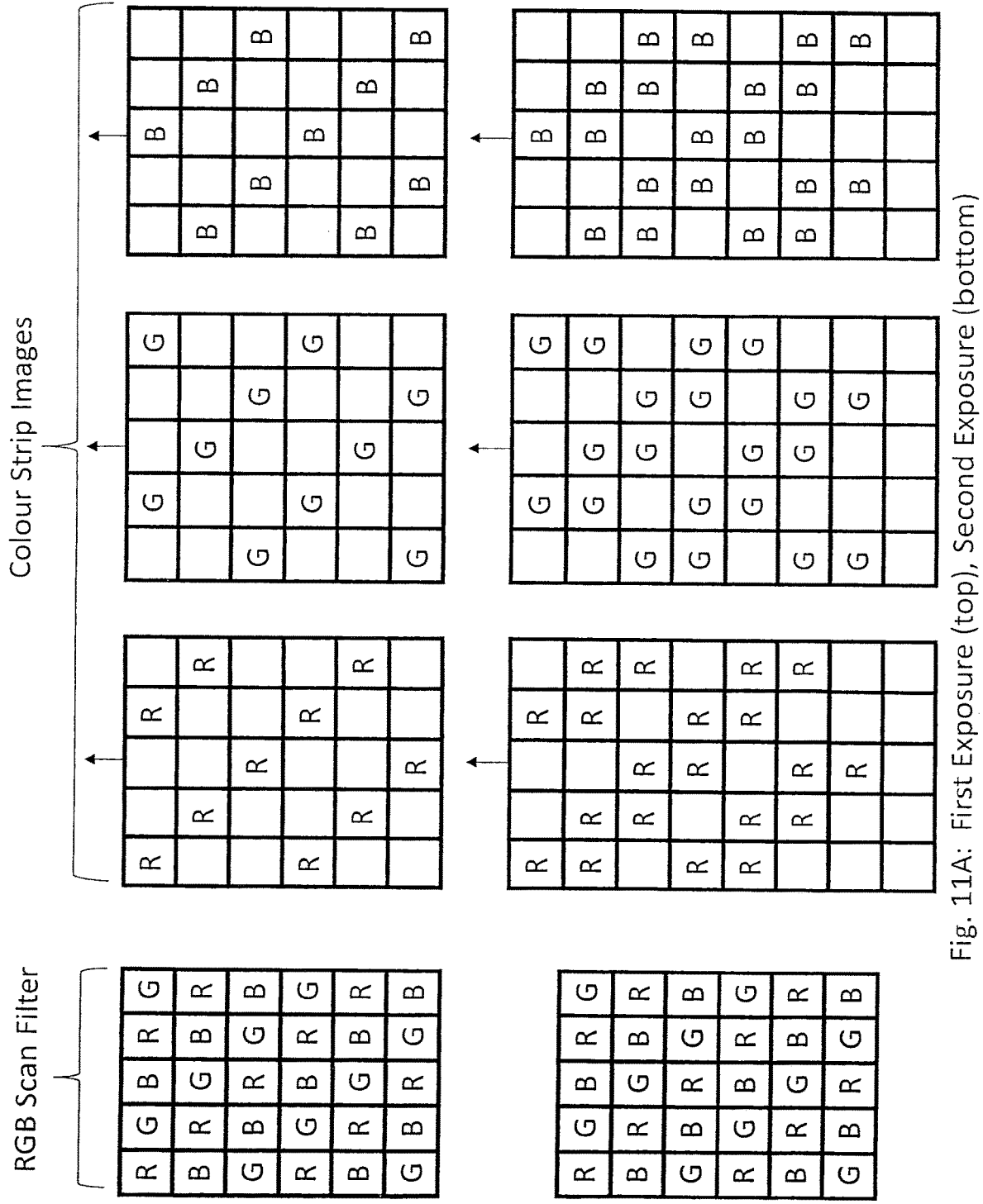
Fig. 11A: First Exposure (top), Second Exposure (bottom)

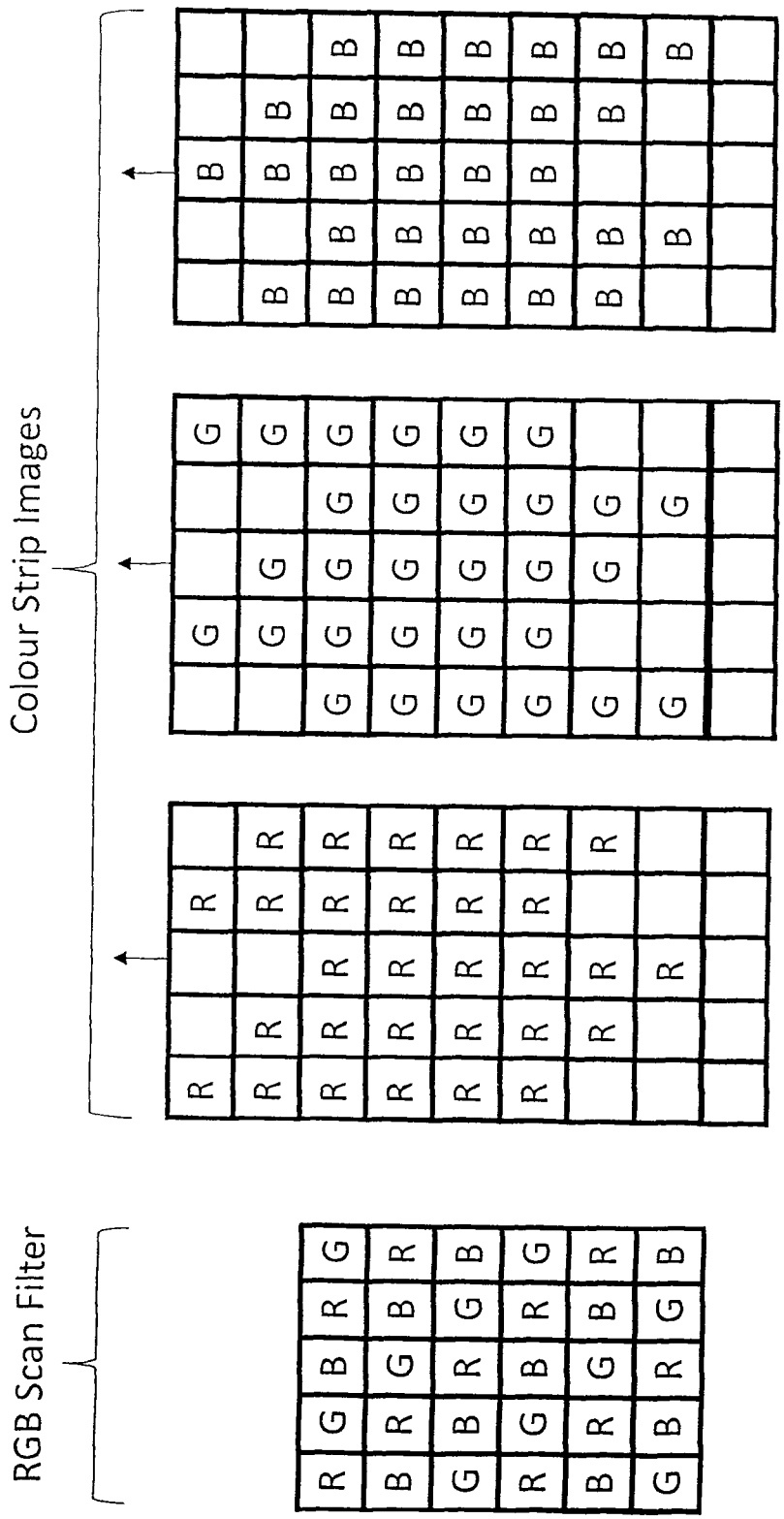
Fig. 11B: Third Exposure

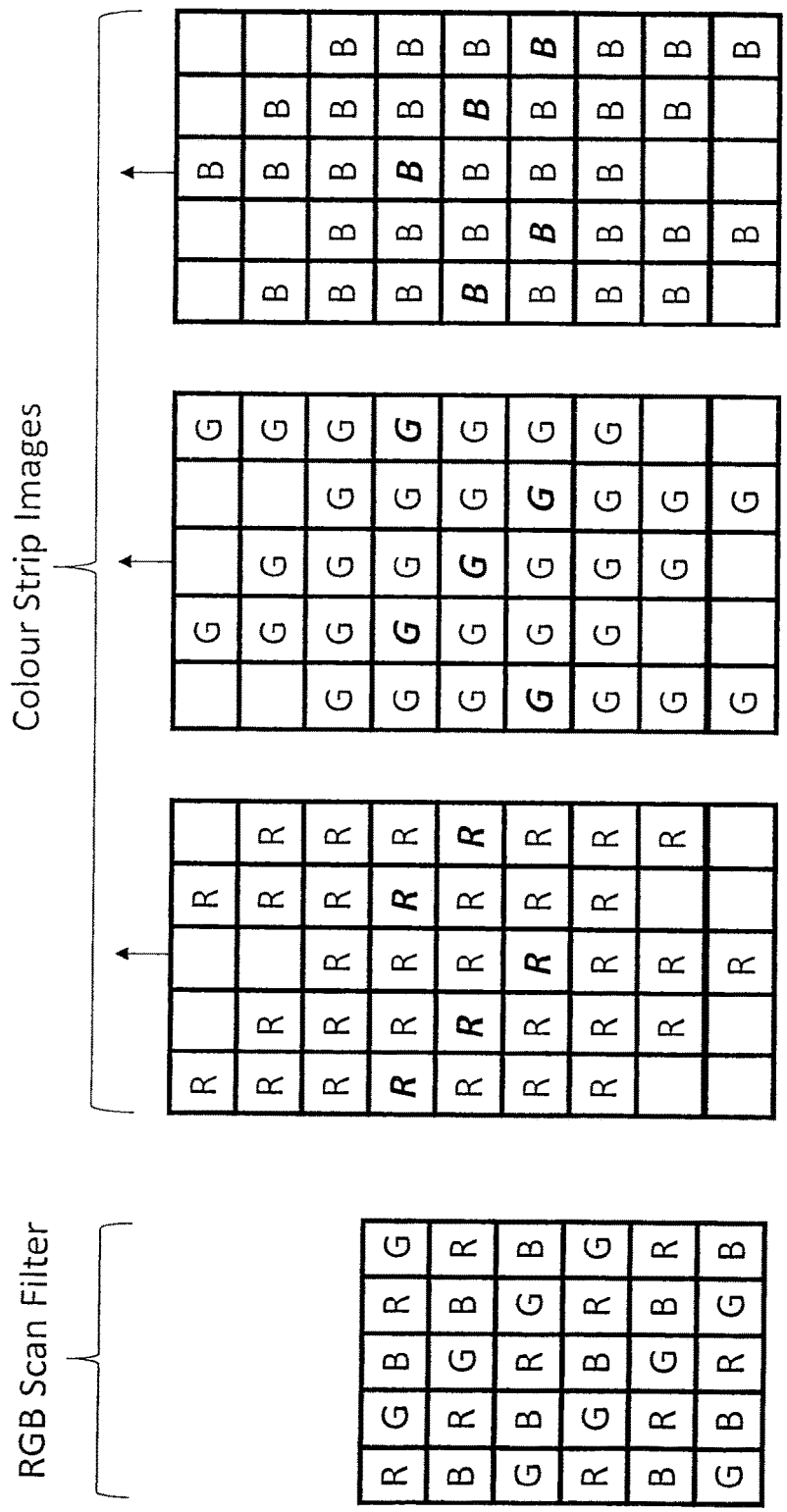
Fig. 11C: Fourth Exposure

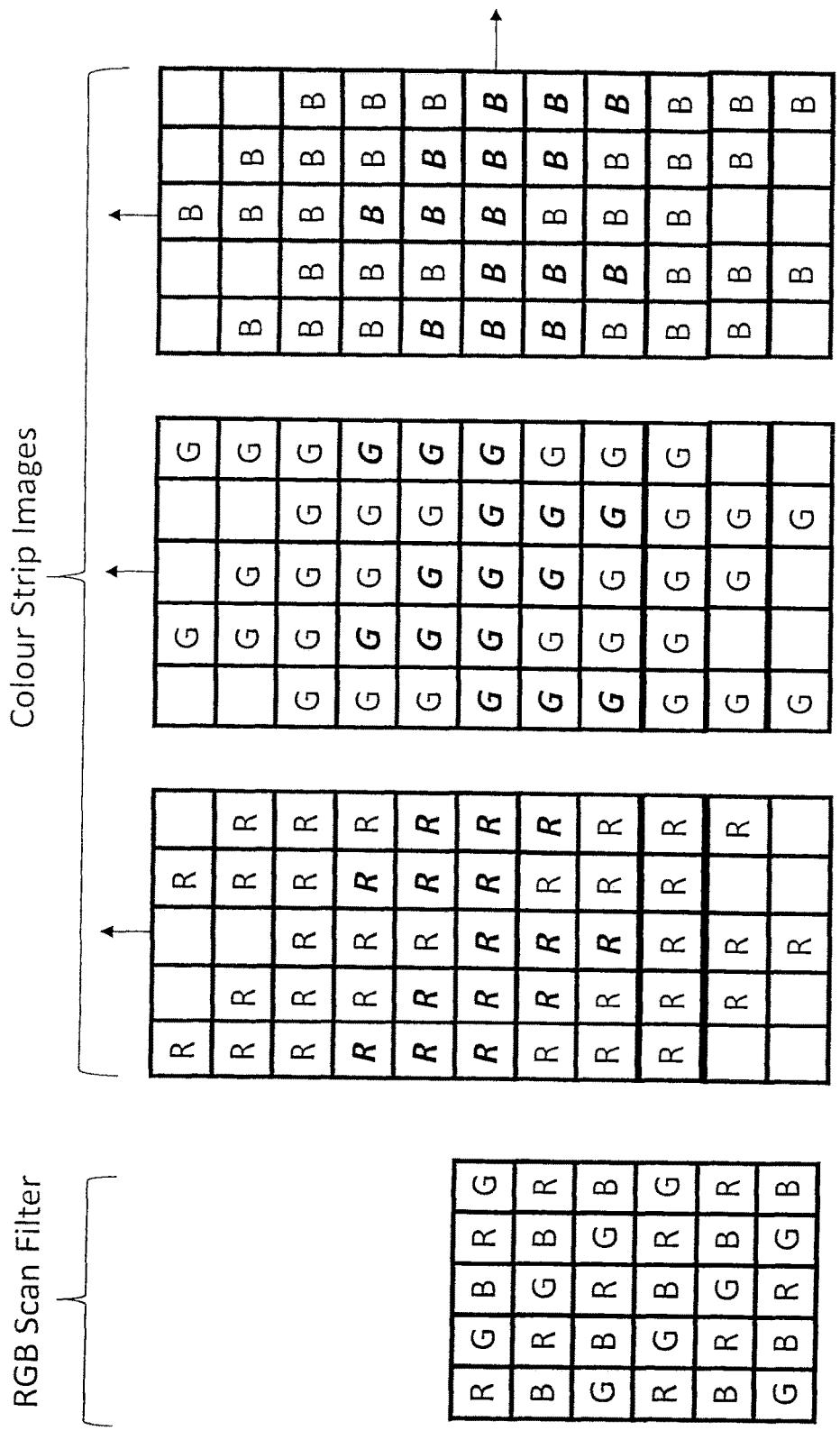
Fig. 11D: Sixth Exposure

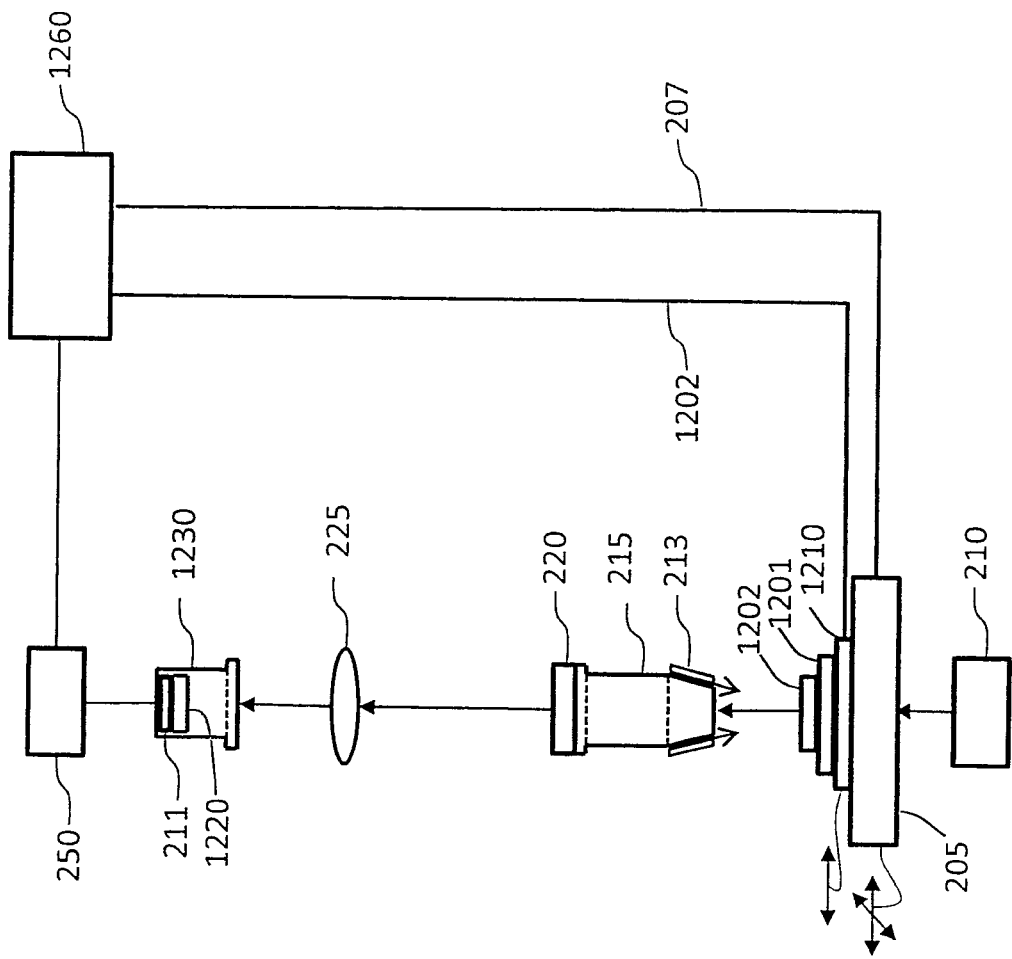
Fig. 12 Combination MSIA and FOV scanner

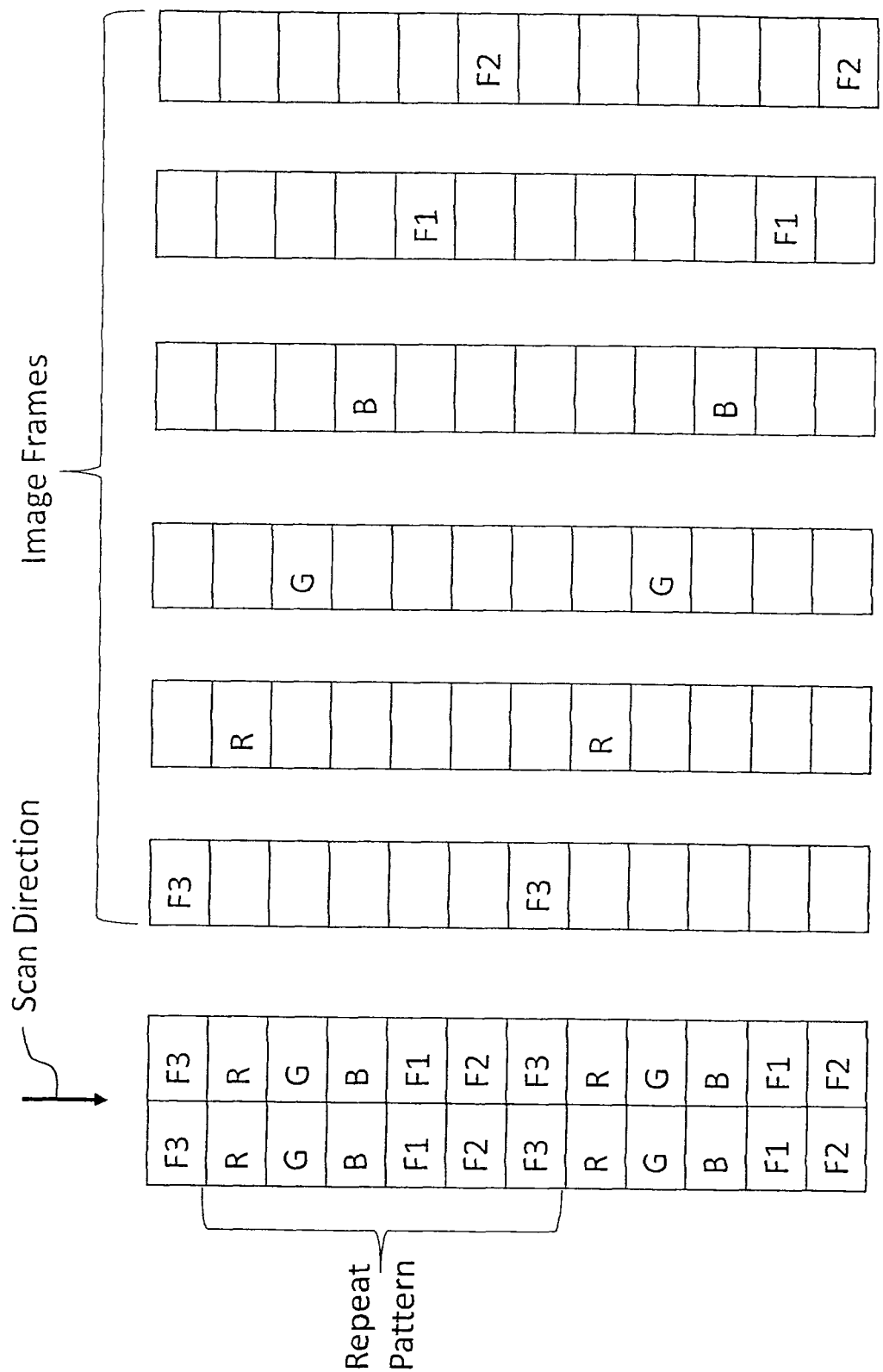
Figure 13A Stage scan image frames, start position

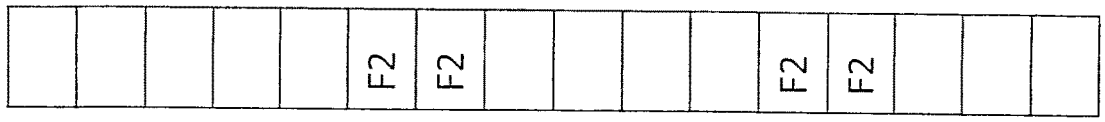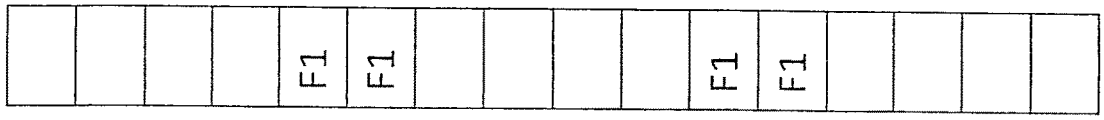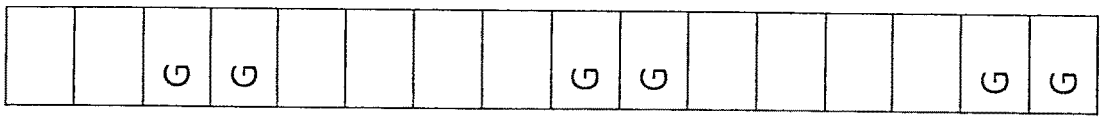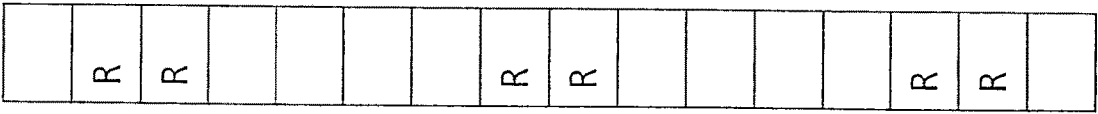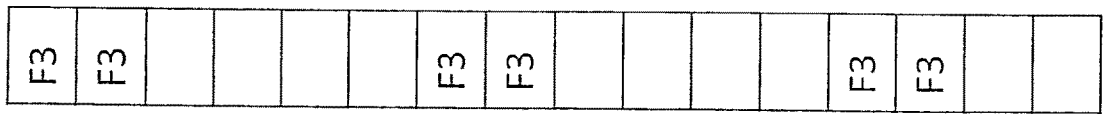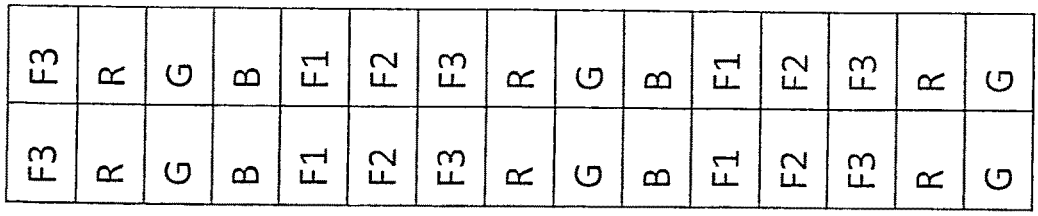
Figure 13B Stage scan image frames, after first step (second exposure)

Figure 13C Stage scan image frames, after second step (third exposure)

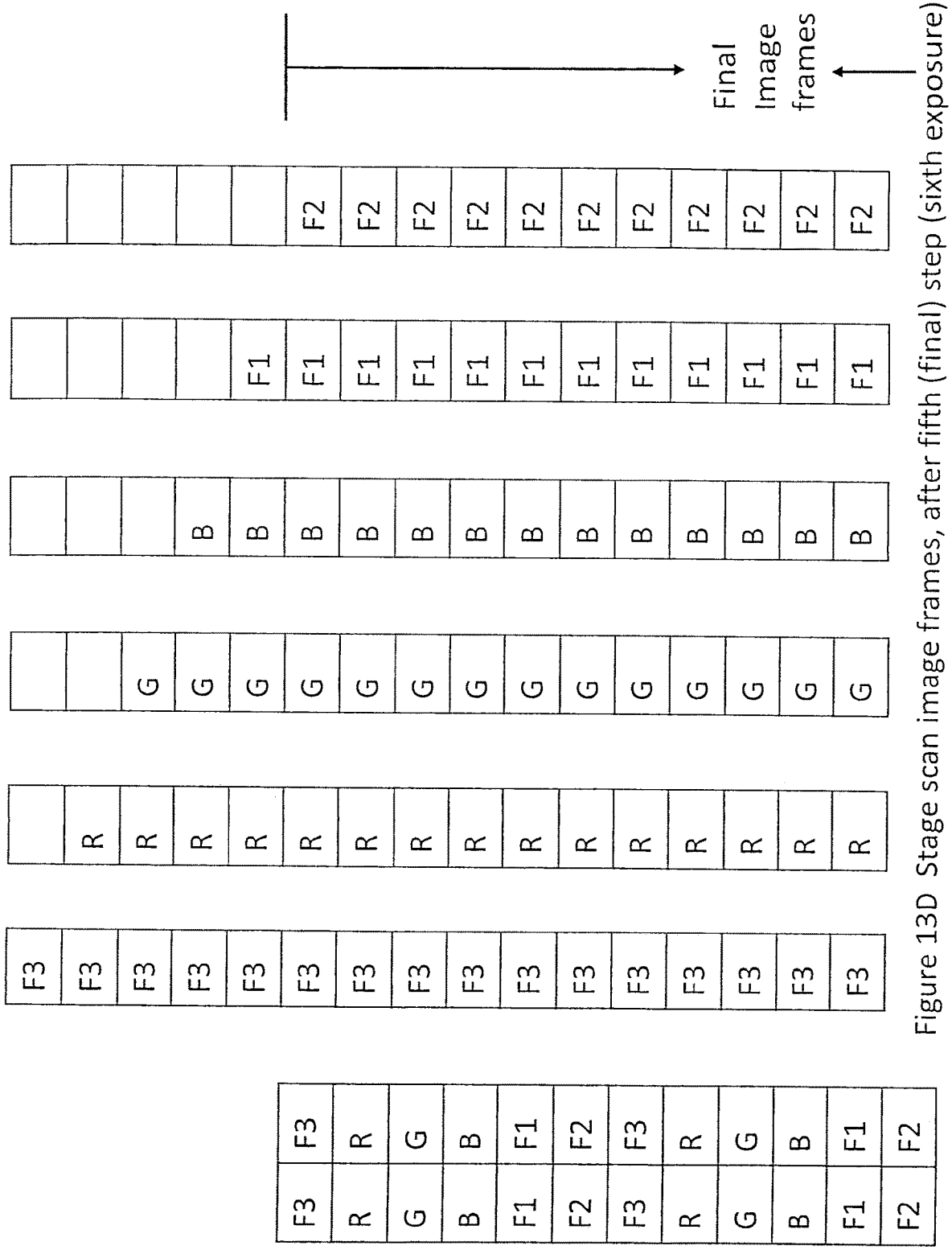
Figure 13D Stage scan image frames, after fifth (final) step (sixth exposure)

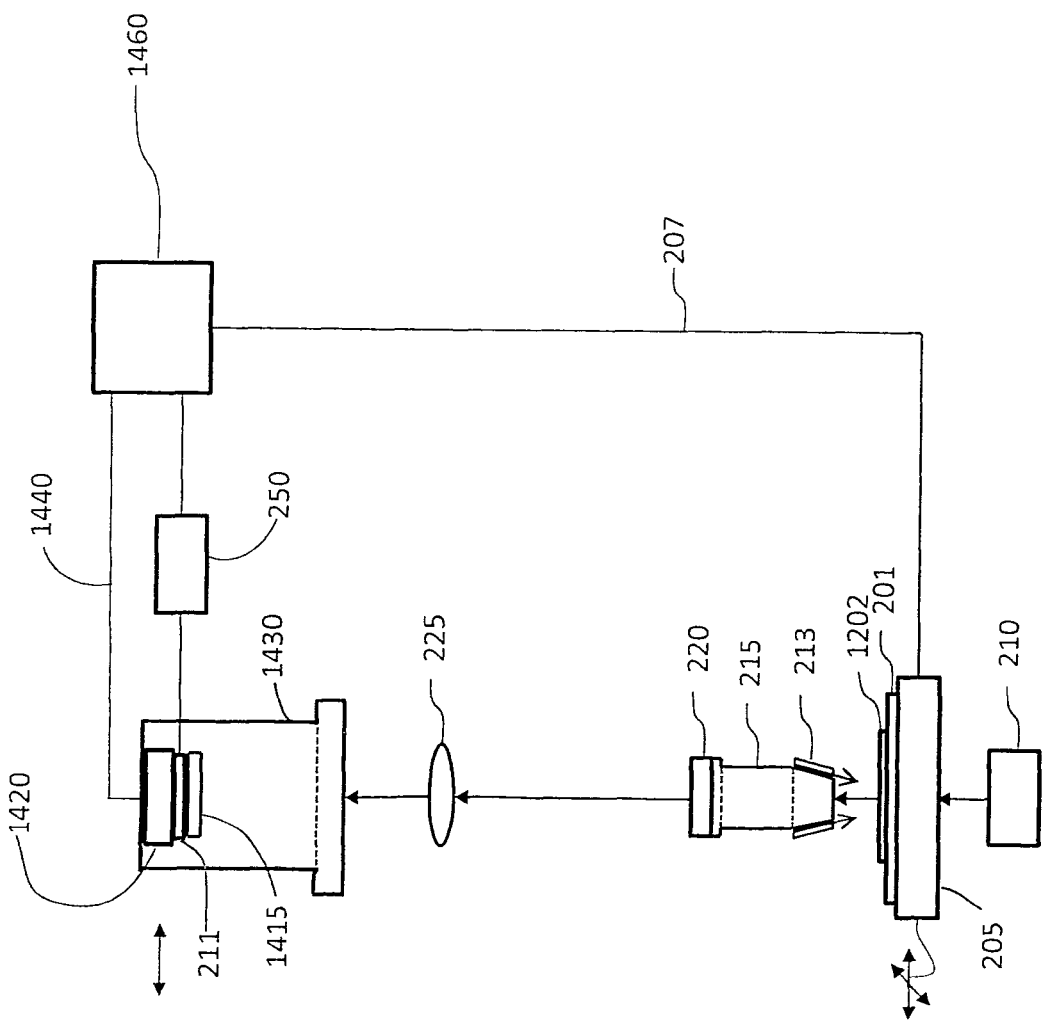
Fig.14 Combination MSIA and FOV scanner with scanning camera

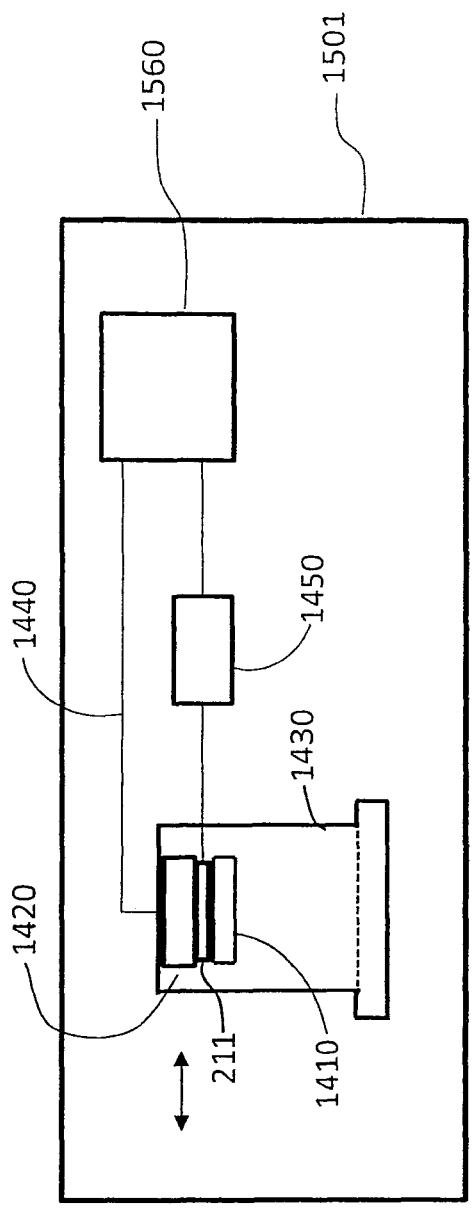
Fig. 15 Digital Scanning Field-of-view Camera

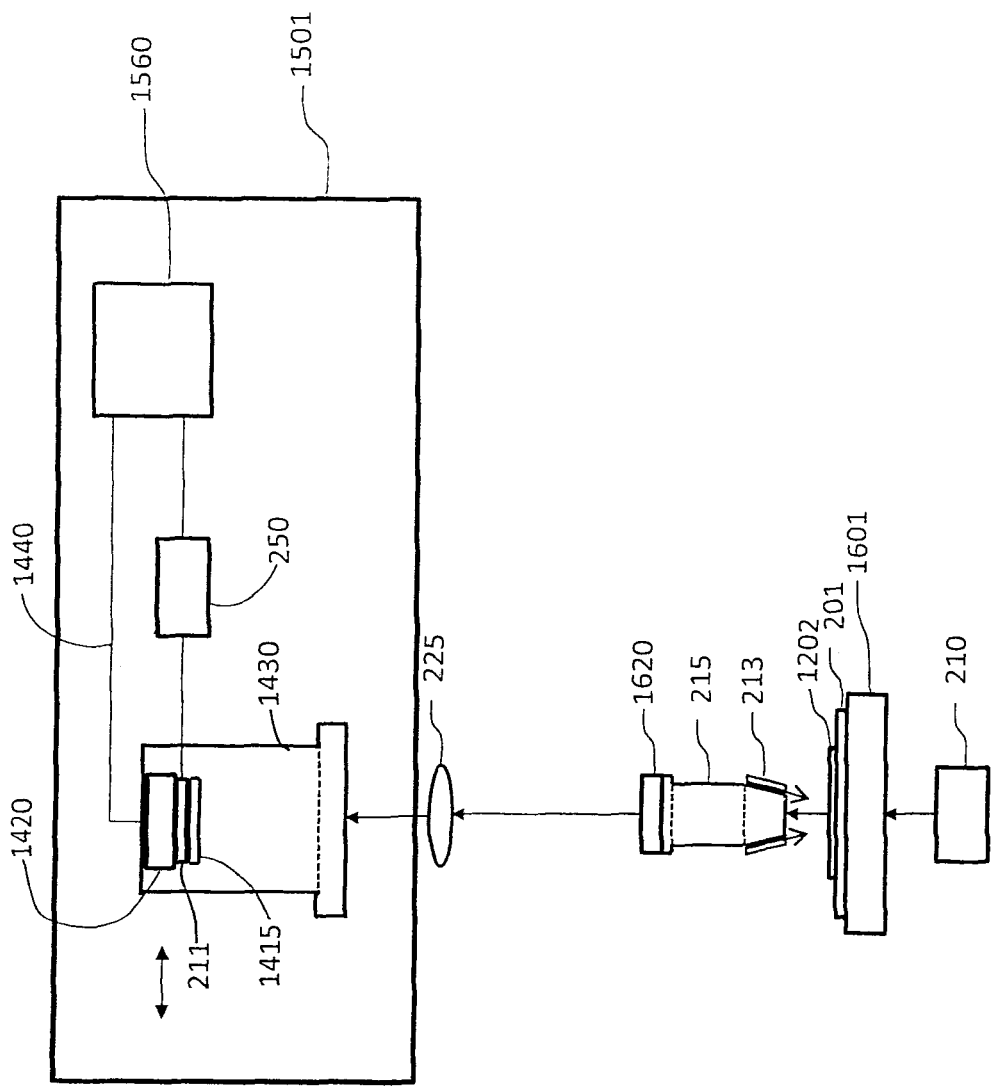
Fig.16 Microscope with Scanning Field-of-View Camera

SPECTRALLY-RESOLVED SCANNING MICROSCOPE

FIELD OF THE INVENTION

This invention relates to the fields of scanning microscope imaging of large specimens with particular emphasis on spectral imaging, including spectrally-resolved photoluminescence and fluorescence, as well as RGB brightfield imaging. Applications include imaging tissue specimens, genetic microarrays, protein arrays, tissue arrays, cells and cell populations, biochips, arrays of biomolecules, detection of nanoparticles, photoluminescence imaging of semiconductor materials and devices, and many others.

Definitions

For the purposes of this patent document, a "macroscopic specimen" (or "large microscope specimen") is defined as one that is larger than the field of view of a compound optical microscope containing a microscope objective that has the same Numerical Aperture (NA) as that of the scanner described in this document.

For the purposes of this patent document, TDI or Time Delay and Integration is defined as a method and detectors used for scanning moving objects, usually consisting of a CCD-based area detector in which charge is transferred from one row of pixels in the area detector to the next in synchronism with the motion of the real image of the moving object. As the object (and its image) moves, charge builds up and the result is charge integration just as if a longer exposure were used in a stationary imaging situation. When the image (and integrated charge) reaches the last row of the array, that line of pixels is read out. One example of such a camera is the DALSA Piranha TDI camera. CMOS TDI imagers have also been developed. CCD TDI imagers combine signal charges, while CMOS TDI imagers combine voltage signals.

For the purposes of this patent document the term "image acquisition" includes all of the steps necessary to acquire and produce the final image of the specimen, including some of but not limited to the following: the steps of preview scanning, instrument focus, predicting and setting gain for imaging each fluorophore, image adjustments including demosaicing (where required), scan linearity adjustment, field flattening (compensating for fluorescence intensity variation caused by excitation intensity and detection sensitivity changes across the field of view), correction of fluorescence signal in one channel caused by overlap of fluorescence from adjacent (in wavelength) channels when two or more fluorophores are excited simultaneously, dynamic range adjustment, butting or stitching together adjacent image strips (when necessary), storing, transmitting, assembling and viewing the final image.

For the purposes of this patent document, a "frame grabber" is any electronic device that captures individual, digital still frames from an analog video signal or a digital video stream or digital camera. It is often employed as a component of a computer vision system, in which video frames are captured in digital form and then displayed, stored or transmitted in raw or compressed digital form. This definition includes direct camera connections via USB, Ethernet, IEEE 1394 ("FireWire") and other interfaces that are now practical.

Moving Specimen Image Averaging ("MSIA") is defined as the method and technology for acquiring digital strip images (image strips) across a large microscope specimen by capturing sequential overlapping frame images of a moving specimen where a new image frame is captured each time the specimen has moved a distance that causes the image of that specimen formed on a two-dimensional area detector to move a distance equal to the distance between rows of detectors in the area detector, image data from the new frame is translated (moved) in computer memory to match the motion of the optical image across the area detector, and is added to (or averaged with) the data previously stored to generate an image of a strip across the specimen, such procedure being continued until the specimen has moved a distance such that all object points in that strip have been exposed a number of times equal to the number of active rows in the area detector (usually chosen by defining a "detector area of interest" that has the width of the detector but a smaller number of rows than the area detector contains), or the number of rows of data chosen for processing from each frame image. The image strip that results has increased signal-to-noise ratio because of pixel averaging, where the increased signal-to-noise ratio is equal to the square root of the number of times each pixel has been averaged to produce the final MSIA strip image, and increased dynamic range.

A frame image and image frame are identical to one another and are used interchangeably throughout this patent document.

Spectral imaging is the method and technology for acquiring images in which each pixel is represented by its spectrum.

Hyperspectral imaging is the method and technology for acquiring images in which each pixel is represented by a spectrum composed of narrow spectral bands over a continuous spectral range.

Imaging spectroscopy is the acquisition and processing of hyperspectral images.

Multispectral imaging is the method and technology for acquiring multiple images of an object, each image representing a range of wavelengths. For example, each image could represent the emission range of a particular fluorophore. In this case each pixel in the final multispectral image does not contain a spectrum of the fluorescence emitted by the specimen at that position, but contains information about the signal detected from each fluorophore at that pixel position.

Fluorescence includes fluorescence from naturally-occurring sources inside the specimen and fluorescent dyes and markers (including quantum dots) that may be added to the specimen, as well as fluorescence from the substrate or a layer above the specimen.

OBJECTS OF THE INVENTION

It is an object of this invention to provide an instrument and method of imaging whereby MSIA scanning is used to produce a hyperspectral image of a large microscope specimen.

It is an object of this invention to provide an instrument and method of imaging whereby MSIA scanning is used to produce an image of a large microscope specimen which is comprised of a hyperspectral image and an RGB colour image and/or a greyscale image.

It is an object of this invention to provide an instrument and method of imaging whereby MSIA scanning is used to produce a multispectral image of a large microscope specimen.

It is an object of this invention to provide an instrument and method of imaging whereby MSIA scanning is used to produce an image of a large microscope specimen which is comprised of a multispectral image and an RGB colour image and/or a greyscale image.

It is an object of this invention to provide an instrument and method of imaging that uses MSIA scanning for hyperspectral or multispectral imaging and also acquires single field of view multispectral or hyperspectral images.

It is an object of this invention to provide a camera and method of multispectral or hyperspectral imaging for use with a standard optical microscope (single field of view imaging).

It is an object of this invention to provide designs for scan filters that can be used for multispectral or hyperspectral imaging using MSIA technology and methods.

It is an object of this invention to provide designs for scan filters that can be used for multispectral or hyperspectral imaging and/or simultaneous RGB or RBGW imaging using MSIA technology and methods.

It is an object of this invention to provide designs for scan filters that can be used for MSIA imaging as well as for single field of view multispectral or hyperspectral imaging and/or RGB or RGBW imaging.

SUMMARY OF THE INVENTION

A scanning microscope for scanning and obtaining a hyperspectral image of at least a portion of a large microscope specimen, the microscope comprising:
a) an illumination system to illuminate a part of the specimen being scanned;
b) at least one lens that focuses light from the specimen onto an area detector, the specimen being mounted on a support that is movable relative to the area detector;
c) the motion of the support being controlled by a computer, the motion of the support being in a direction perpendicular to rows of the area detector;
d) the area detector having a scan filter with a repeat pattern of a plurality of rows that is repeated at least across an active area of an entire surface of the area detector, each row of the repeat pattern being covered by a bandpass filter, there being a plurality of repeat patterns and a plurality of bandpass filters having the same bandwidth, each bandpass filter transmitting a narrow spectral range, the bandpass filters forming a hyperspectral filter with a bandwidth that is equal to a sum of the bandwidths of the separate bandpass filters for each of the rows;
e) the area detector is computer controlled to capture sequential substantially overlapping frame images of the specimen each time that an optical image of the specimen has moved a distance relative to the area detector that is equal to the distance between adjacent rows of the area detector, image data from each new frame image translated in computer memory to match a motion of an optical image across the area detector and added to or averaged with any data previously stored to generate an image of a strip across the specimen, the capturing of frame images continuing until the specimen has moved a relative distance where all object points in that strip have been exposed a number of times equal to a chosen number of active rows in the area detector; and
f) a final hyperspectral image resulting from the portion of the specimen scanned having a representation of each pixel by a spectrum composed of narrow spectral bands over a continuous spectral range.

A scanning microscope for scanning and obtaining a multispectral image of at least a portion of a large microscope specimen, the microscope comprising:
a) an illumination system to illuminate a part of the specimen being scanned;
b) at least one lens that focuses light from the specimen onto an area detector, the specimen being mounted on a support that is movable relative to the area detector;
c) the motion of the support being controlled by a computer, the motion of the support being in a direction perpendicular to rows of the area detector;
d) the specimen containing F fluorophores that are excited by light from the illumination system, the area detector having a scan filter with a repeat pattern of F rows that is repeated at least across an active area of an entire surface of the area detector, each row of the repeat pattern contains an emission filter for a specific fluorophore, the filter transmitting a spectral range of fluorescence emitted from each pixel position for each of the fluorophores when illuminated by the illumination system with a frequency or range of frequencies chosen to excite some or all of the fluorophores in the specimen, each emission filter transmitting the intensity of the fluorescence emitted, the emission filters forming a multispectral filter;
e) the area detector is computer controlled to capture sequential substantially overlapping frame images of the specimen each time that an optical image of the specimen has moved a distance relative to the area detector that is equal to the distance between adjacent rows of the area detector, image data from each new frame image translated in computer memory to match a motion of an optical image across the area detector and added to or averaged with any data previously stored to generate an image of a strip across the specimen, the capturing of frame images continuing until the specimen has moved a relative distance where all object points in that strip have been exposed a number of times equal to a chosen number of active rows in the area detector; and
f) a final multispectral fluorescence image resulting from the portion of the specimen scanned having a representation of each pixel by an intensity of the fluorescence emitted of each of the fluorophores at each pixel position on the specimen.

A scanning microscope for scanning and obtaining a hyperspectral image of at least a portion of a large microscope specimen, the microscope comprising:
a) an illumination system to illuminate a part of the specimen being scanned;
b) at least one lens that focuses light from the specimen onto an area detector, the specimen being mounted on a support that is movable relative to the area detector;
c) the motion of the support being controlled by a computer, the motion of the support being in a direction perpendicular to rows of the area detector;
d) the area detector having a scan filter with a repeat pattern of a plurality of rows that is repeated at least across an active area of an entire surface of the area detector, the repeat pattern having at least six rows:
i) three rows of the at least nine rows being RGB rows, one row covered with a red filter, one row covered with a green filter and one row covered with a blue filter;
ii) each of the remaining rows of the at least six rows of the repeat pattern being covered by a bandpass filter, there being a plurality of repeat patterns and a plurality of bandpass filters having the same bandwidth, each bandpass filter transmitting a narrow spectral range, the bandpass filters forming a hyperspectral filter with a bandwidth that is equal to a sum of the bandwidths of the separate bandpass filters for each of the rows;
e) the area detector is computer controlled to capture sequential substantially overlapping frame images of the specimen each time that an optical image of the specimen has moved a distance relative to the area detector that is equal to the distance between adjacent rows of the area detector, image data from each new frame image translated in computer memory to match a motion of an optical image across the area detector and added to or averaged with any data previously stored to generate an image strip across the specimen from images obtained from the bandpass filters, the capturing of frame images continuing until the specimen has moved a relative distance where all object points in that strip have been exposed a number of times equal to a chosen number of active rows in the area detector;

f) the red, green and blue filters enabling RGB imaging of the specimen; and g) a final hyperspectral image resulting from the portion of the specimen scanned having a representation of each pixel by a spectrum composed of narrow spectral bands over a continuous range obtained from the bandpass filters registered with a final RGB image obtained from the RGB imaging.

A scanning microscope for scanning and obtaining a multispectral image of at least a portion of a large microscope specimen, the microscope comprising:

a) an illumination system to illuminate a part of the specimen being scanned;

b) at least one lens that focuses light from the specimen onto an area detector, the specimen being mounted on a support that is movable relative to the area detector;

c) the motion of the support being controlled by a computer, the motion of the support being in a direction perpendicular to rows of the area detector;

d) the area detector having a scan filter with a repeat pattern of a plurality of rows that is repeated across at least an active area of an entire surface of the area detector, the repeat pattern having at least five rows:

i) four rows of the at least five rows being RGBW rows, one row covered with a red filter, one row covered with a green filter, one row covered with a blue filter and one row covered with a white filter, the white filter being a clear filter;

ii) the specimen containing at least one fluorophore, each of the remaining rows of the at least five rows of the repeat pattern being covered by an emission filter for a specific fluorophore, there being a plurality of repeat patterns and a plurality of emission filters, the emission filters measuring an intensity of the fluorescence emitted from each pixel position for each of the fluorophores when illuminated by the illumination system with a frequency or range of frequencies chosen to excite some or all of the fluorophores in the specimen, there being one row of the remaining rows of the repeat pattern for each fluorophore, each emission filter transmitting the intensity of the fluorescence emitted, the emission filters forming a multispectral filter;

e) the area detector is computer controlled to capture a frame image of the specimen each time that an optical image of the specimen has moved a distance relative to the area detector that is equal to the distance between adjacent rows of the area detector, image data from each new frame image translated in computer memory to match a motion of an optical image across the area detector and added to or averaged with any data previously stored to generate an image of a strip across the specimen, the capturing of frame images continuing until the specimen has moved a relative distance where all object points in that strip have been exposed a number of times equal to a chosen number of active rows in the area detector; and f) the red, green and blue filters enabling RGB imaging of the specimen and the clear filter enabling greyscale imaging; and g) a final image composed of one or more registered images of a multispectral fluorescence image resulting from the portion of the specimen scanned having a representation of each pixel by an intensity of the fluorescence emitted of each of the fluorophores at each image pixel position on the specimen, and a final RGB image resulting from the RGB imaging registered with a final greyscale image resulting from the greyscale imaging using the clear filter and an additional fluorescence image resulting from an emission filter inserted into optics of the microscope when used with the clear filter.

A scanning microscope for scanning and obtaining at least one of a multispectral image and an RGB image of at least a portion of a large microscope specimen, the microscope comprising:

a) an illumination system to illuminate a part of the specimen being scanned;

b) at least one lens that focuses light from the specimen onto an area detector, the specimen being mounted on a support that is movable relative to the area detector;

c) the motion of the support being controlled by a computer, the motion of the support being in a direction perpendicular to rows of the area detector;

d) the area detector having a scan filter that has a repeat pattern of at least four rows with a first set of at least XN rows, with each row being of one colour, N being the number of adjacent rows of the same colour and being equal to or greater than one, X being the number of different colours and being equal to or greater than three, at least three of the colours being red, green and blue, and a second set of at least one row of the at least four rows of the repeat pattern containing an emission filter for a specific fluorophore, the emission filter transmitting a spectral range of fluorescence for each pixel position for at least one fluorophore illuminated by the illumination system with a frequency or range of frequencies chosen to excite the at least one fluorophore in the specimen, there being one emission filter and one row of the second set of the area detector for each fluorophore of the specimen, each emission filter transmitting the intensity of the florescence emitted, the at least one emission filter forming a multispectral filter that transmit a range of wavelengths chosen to match emission spectra of fluorophores in which there are two rows of the second set of at least six rows for each fluorophore;

e) the area detector is computer controlled to capture frame image of the specimen each time that an image of the specimen has moved a distance relative to the area detector that is equal to the distance between adjacent rows of the area detector, image data from each new frame image translated in computer memory to match a motion of an optical image across the area detector and added to or averaged with any data previously stored to generate an image of a strip across the specimen, the capturing of frame images continuing until the specimen has moved a relative distance where all object points in that strip have been exposed a number of times equal to a chosen number of active rows in the area detector;

f) the red, green and blue filters enabling RGB imaging of the specimen; and g) a final image composed of one or more registered images of a multispectral fluorescence image resulting from the portion of the specimen scanned having a representation of each pixel by an intensity of the fluorescence emitted of each of the fluorophores, and a final RGB image of the specimen resulting from the RGB imaging.

A scanning microscope for scanning and obtaining one or more of Moving Specimen Image Averaging (MSIA) and Single Field Of View (SFOV) images hyperspectral and multispectral images of at least a portion of a large microscope specimen, the microscope comprising:
a) an illumination system to illuminate a part of the specimen being scanned;
b) at least one lens that focuses light from the specimen onto an area detector, the specimen being mounted on a support, relative motion between the support and the area detector controlled by a computer;
c) the relative motion between the support and the area detector controlled by a computer the relative motion being in a direction perpendicular to rows of the area detector, comprising one or more images of a specimen of hyperspectral, multispectral, RGB, RGBW and W;
d) the area detector having a scan filter that substantially covers an entire area of the area detector with a repeat pattern having at least three rows and an active area having at least six rows, the scan filter having a format of wherein there are successive diagonal rows of red, green, blue, and/or white, where white is a clear filter, and/or diagonal fluorescence and/or hyperspectral filters;
e) during MSIA imaging, the area detector is computer controlled to capture a frame image of the specimen each time that an optical image of the specimen is moved a distance relative to the area detector that is equal to the distance between adjacent rows of the area detector, image data from each new frame image translated in computer memory to match a motion of an optical image across the area detector and added to or averaged with any data previously stored to generate an image of a strip across the specimen, the capturing of frame images continuing until the specimen has moved a relative distance so that data in the colour strip images opposite a last row of the active area of the area detector is completely exposed and is exposed a number of times equal to a number of rows in the active area of the area detector divided by the number of rows in the repeat pattern;
f) during SFOV imaging, the area detector is computer controlled to capture an SFOV frame image of the specimen each time that an optical image of the specimen is moved a distance relative to the area detector that is equal to the distance between adjacent rows of the area detector, the relative movement between the area detector and the specimen stopping as each SFOV image is taken, there being one frame image for each row of the repeat pattern and any repetitions of the repeat pattern;
g) the red, green and blue filters enabling RGB imaging of the specimen, the red, green, blue and/or white filters enabling RGB imaging or greyscale imaging respectively; and
h) a final image composed of one or more registered images of a hyperspectral image, a multispectral fluorescence image an RGB image, an RGBW image and a W image resulting from the portion of the specimen scanned.

A digital scanning single field of view camera for use on an optical microscope comprises a scan filter for one or more of multispectral, hyperspectral or including RGB, and/or RGBW, and/or W rows. The scan filter has a repeat pattern that covers substantially an entire area of an area detector. The area detector with the scan filter is mounted on a scanning stage relative to the area detector and to control the area detector. A computer is programmed to control a movement of the scanning stage to acquire one frame image for each row in a repeat pattern as the scan proceeds, assemble frame images for each colour in the repeat pattern, and, when the scan is complete, to produce a final image that is one or more of a multispectral image, a hyperspectral image, an RGB image, an RGBW image, a W image and an SFOV image.

BRIEF DESCRIPTION OF THE DRAWINGS

In the Drawings:
FIG. 1 shows a schematic view of a scan filter for hyperspectral imaging;
FIG. 2 shows a schematic view of a hyperspectral MSIA scanner;
FIG. 4A is a schematic view of data collection during MSIA scanning using a scanning colour filter array for hyperspectral imaging;
FIG. 4B is a schematic view of data collection during MSIA scanning using a scanning colour filter array for hyperspectral imaging after a second exposure;
FIG. 4C is a schematic view of data collection during MSIA scanning using a scanning colour filter array for hyperspectral imaging after a third exposure;
FIG. 4D is a schematic view of data collection during MSIA scanning using a scanning colour filter array for hyperspectral imaging after a sixth exposure;
FIG. 4E is a schematic view of data collection during MSIA scanning using a scanning colour filter array for hyperspectral imaging after a seventh exposure;
FIG. 4F is a schematic view of data collection during MSIA scanning using a scanning colour filter array for hyperspectral imaging after a eighth exposure;
FIG. 4G is a schematic view of data collection during MSIA scanning using a scanning colour filter array for hyperspectral imaging after a twelfth exposure;
FIG. 5 shows a scan filter for multispectral imaging of five fluorophores;
FIG. 6 shows a schematic view of a fluorescence MSIA scanner using a multispectral fluorescence scan detector;
FIG. 7 shows a scan filter for combined RGB and Hyperspectral imaging;
FIG. 8 shows a scan filter for imaging RGB and W and five fluorophores;
FIG. 9 shows a scan filter that enables binning;
FIG. 10 shows a diagonal format RGB scan filter;
FIG. 11A shows data acquired using the diagonal format RGB scan filter being loaded into the R, G and B strip images as the scan proceeds in a first exposure and in a second exposure;
FIG. 11B shows data acquired using the diagonal format RGB scan filter being loaded into the R, G and B strip images as the scan proceeds in a third exposure;
FIG. 11C shows data acquired using the diagonal format RGB scan filter being loaded into the R, G and B strip images as the scan proceeds in a fourth exposure;
FIG. 11D shows data acquired using the diagonal format RGB scan filter being loaded into the R, G and B strip images as the scan proceeds in a sixth exposure;
FIG. 12 shows a schematic view of a scanner for MSIA and Field-of-View scanning;
FIG. 13A shows data being collected in a first exposure during Single Field-of-View scanning using a scan filter that contains R, G and B filter rows and 3 rows containing emission filters for different fluorophores;

FIG. 13B shows data being collected in a second exposure during Single Field-of-View scanning using a scan filter that contains R, G and B filter rows and 3 rows containing emission filters for different fluorophores;

FIG. 13C shows data being collected in a third exposure during Single Field-of-View scanning using a scan filter that contains R, G and B filter rows and 3 rows containing emission filters for different fluorophores;

FIG. 13D shows data being collected in a sixth exposure during Single Field-of-View scanning using a scan filter that contains R, G and B filter rows and 3 rows containing emission filters for different fluorophores;

FIG. 14 shows a schematic view of a combination MSIA and FOV scanner, where the FOV scanner uses a scanning camera;

FIG. 15 shows a schematic view of a digital scanning FOV camera; and

FIG. 16 shows a schematic view of a basic manual microscope to which a digital scanning FOV camera has been added.

DESCRIPTION OF THE INVENTION

Figure 1:
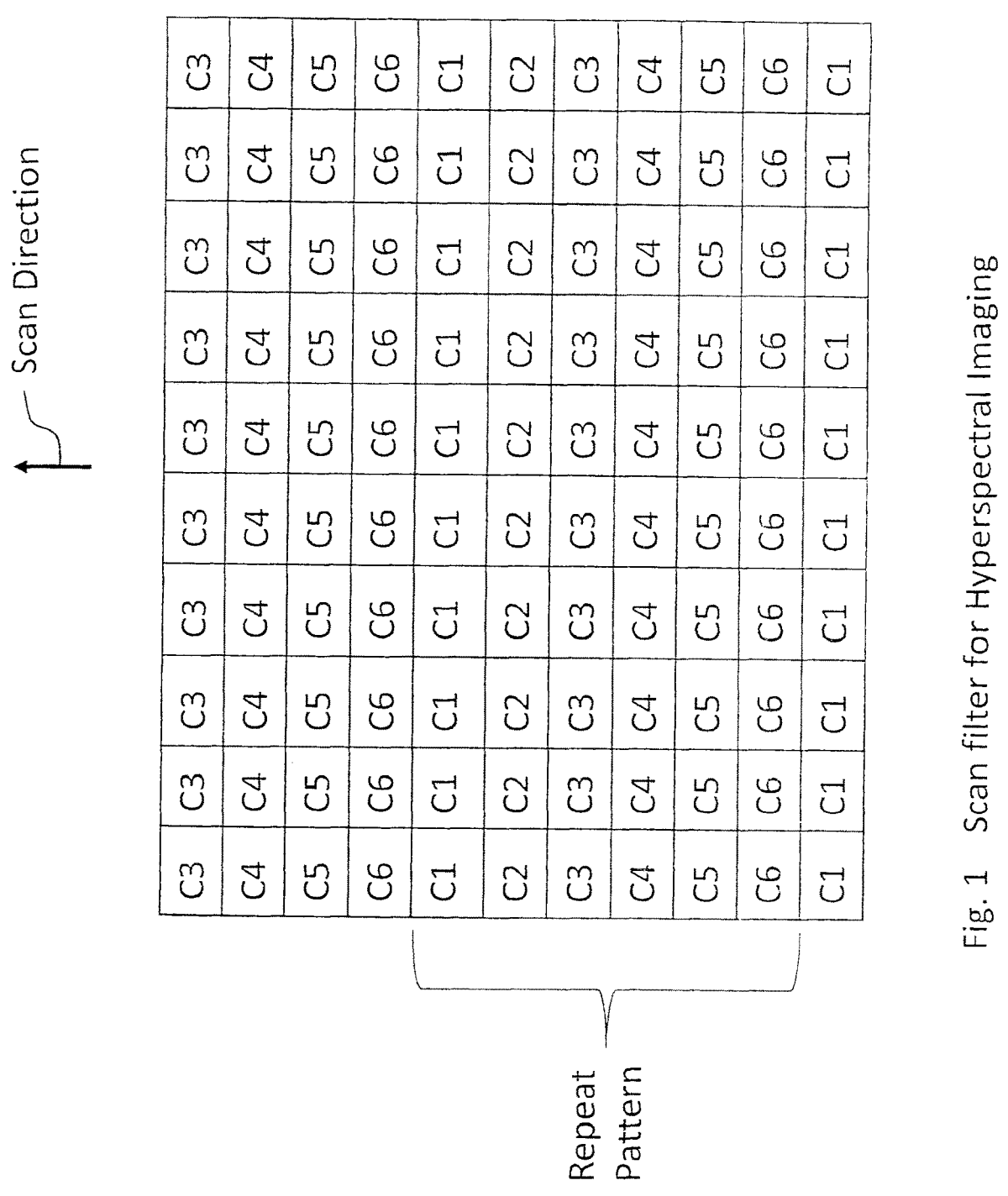
Figure 3:
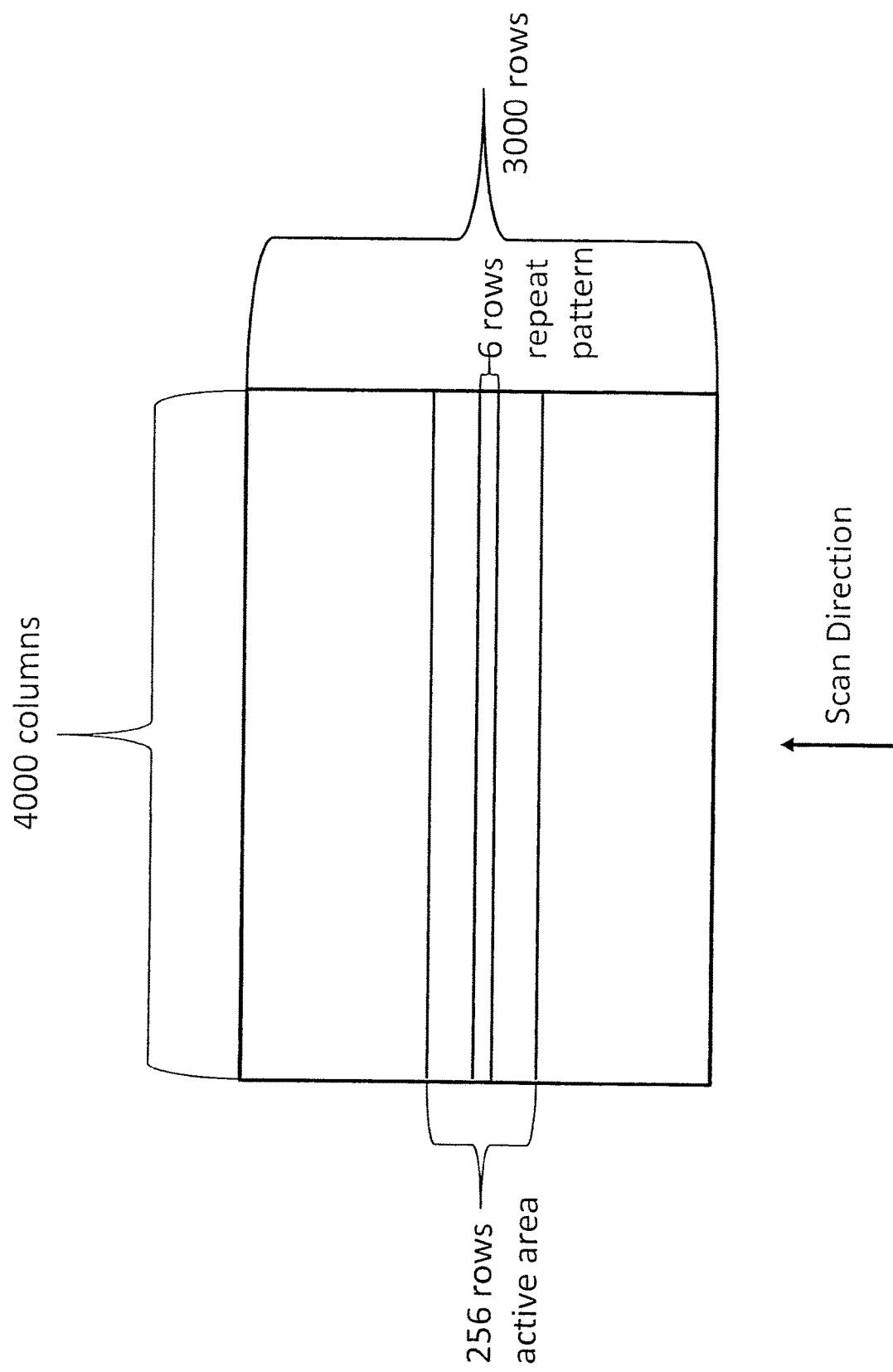
FIG. 3 is a schematic view of a 4000 column by 3000 row area detector covered by a scanning colour filter array.

FIG. 1 shows a schematic representation of a scan filter for Hyperspectral imaging that is a first embodiment of this invention. This example is a scan filter for MSIA imaging with a Repeat Pattern of 6 rows (in this example) that are repeated across an entire surface of an active area of an area detector (not shown in FIG. 1). Each of the 6 rows of the area detector is covered with a bandpass filter that transmits a narrow spectral range. The bandwidth of each filter is the same, and includes substantially all of the wavelength range between the filters in adjacent rows in the repeat pattern. The bandwidth of the hyperspectral filter is equal to the sum of the bandwidths of the separate bandpass filters on each of the six rows. The bandwidth of the hyperspectral filter and the number of different rows of separate filters is chosen to match the application, usually covering a range of wavelengths in the visible, but sometimes including wavelengths in the near UV or the near IR.

FIG. 2 is a schematic representation of a hyperspectral MSIA scanner that is a second embodiment of this invention. Light from light source 213 illuminates an area of the surface of specimen 202, which is mounted on specimen holder 201 on moving microscope stage 205. This kind of illumination, where the light illuminating the specimen comes from above the specimen, is called epi-illumination (epi-illumination can also be provided using other arrangements, including light injected into the microscope between microscope objective 215 and tube lens 225, and reflected downwards to illuminate the specimen through microscope objective 215, as shown in FIG. 6). The motion of Microscope stage 205 is controlled by computer 206 through wired or wireless connection 207. Motion of the microscope stage is in a direction perpendicular to rows in the area detector {data is read out from rows in the area detector, usually the long dimension of the array (for example see Hamamatsu's ORCA-flash 4.0 camera, or PCO's pco.edge camera, both of which use Scientific CMOS (sCMOS) area detectors)}. Light emitted by or reflected from the specimen is collected by microscope objective 215 which is focused on the specimen by piezo positioner 220 (or other focusing mechanism) and is focused by tube lens 225 onto area detector 211, which is covered by a hyperspectral scanning colour filter array 212 like that shown in FIG. 1. Area detector 211 and colour filter array 212 are contained inside hyperspectral camera 230. Data from the area detector 211 is read out by frame grabber 250 and passed to computer 206 where an image strip is assembled for each colour in the spectrum represented by the filters in the Repeat Pattern of the hyperspectral imaging scan filter. Image data for each exposure is passed by the frame grabber to the computer where it is added to or averaged with data already present in the lengthening image strips in the Moving Specimen Image Averaging (MSIA) process.

Note that when storing data in the MSIA strip images, the averaging calculation for each colour in the hyperspectral scan filter (each row of data in each image frame) can be different, which allows the gain for each colour (each image strip) to be adjusted to calibrate the spectral response of this imaging spectrometer. This technique can also be used to increase the gain for weak fluorophores when performing fluorescence imaging using MSIA.

When rows of image data in the image strips have been exposed the number of times set by the active area of the area detector and the repeat pattern of the filter, the computer starts assembly of the final hyperspectral image strip, where each image pixel contains intensity data for each colour in the repeat pattern. As one example, assume that the hyperspectral scan filter has a repeat pattern of six colours (like that shown in FIG. 1), and that an active area of 256 rows by 4000 columns has been chosen in the area detector (the size of active areas available for the user to choose is set by the area detector manufacturer), as shown in FIG. 3. In this example, each row in the strip image will be exposed 256/6=42.7 times. It would be better to use an active area for 252 rows by 4000 columns, but 252 was not provided by the manufacturer of the area detector. Since the computer has access to every frame image when it is passed to the computer by the frame grabber, it is possible to define an effective active area that is smaller than the actual active area provided by the area detector manufacturer by simply programming the computer to discard extra rows of data from the image frames being passed from the frame grabber to the computer. In this case, if the first two rows and the last two rows in each image frame are discarded, the effective active area is 252 rows, and each row in the image strip will be exposed 252/6=42 times, resulting in an increase in Signal/Noise ratio for each image pixel of the square root of 42, or 6.5, because of MSIA averaging. In this example, the computer can start to assemble the final hyperspectral image strip after 252 exposures are completed, when the edge of the specimen has moved a distance that causes the image of the specimen projected onto the area detector to move across the entire effective active area defined above (or in this case, 252 times the distance between rows of pixels in the array). A series of adjacent hyperspectral image strips are assembled to produce a hyperspectral image of the entire specimen, or a large area of interest in the specimen.

One application of a hyperspectral MSIA scanner (an imaging spectrometer) using epi-illumination is for photoluminescence imaging of semiconductor wafers and devices. If light source 213 shown in FIG. 2 provides ultraviolet illumination, the hyperspectral scan filter can be designed to detect the spectrum of photoluminescence from a semiconductor specimen.

Light source 210 in FIG. 2 illuminates the specimen from beneath, and in that case area detector 211 which is covered by a scan filter for hyperspectral imaging 212 can be used for MSIA scanning to produce a hyperspectral image of the light transmitted through the specimen.

FIG. 3 shows a schematic view of an area detector that is (in this example) 4000 pixels wide and 3000 rows long, where an entire active area of the area detector is covered with a scanning filter array with a pattern of rows that is repeated many times, and where the repeat pattern is small compared to the number of rows in the array. When used for MSIA scanning, it is common to choose an active area of the area detector that includes the entire width of the array, and a smaller number of active rows near the center of the array. This has the advantage of increasing the scan speed since each frame image acquired during the MSIA scan is only 256×4000 pixels in size (in this example), and many cameras have a much increased frame rate when using a small active area like this one. For this example, assume that the pattern of the scanning filter array that has been fabricated on top of the pixels in the area detector is repeated every 8 rows. In this particular example, when used for MSIA scanning with the active area just described, every pixel position in the repeat pattern will be exposed 32 times during the scan, so the Signal/Noise ratio in the final MSIA image strip is increased by MSIA averaging by a factor of the square root of 32 (a factor of 5.6).

Several combinations of rows and repeat patterns work well for MSIA scanning. Using the previous example (8 colour filters, and an active area of 256 rows), an MSIA filter can be designed with each colour occupying single rows for a repeat pattern of 8 rows (as shown in FIG. 3), two adjacent rows for a repeat pattern of 16 rows, or 4 adjacent rows for a repeat pattern of 32 rows, or 8 adjacent rows for a repeat pattern of 64 rows, or 16 adjacent rows for a repeat pattern of 128 rows, or 32 adjacent rows for a repeat pattern of 256 rows. In each case every pixel in the repeat pattern will be exposed 32 times during the scan.

Figure 4F:
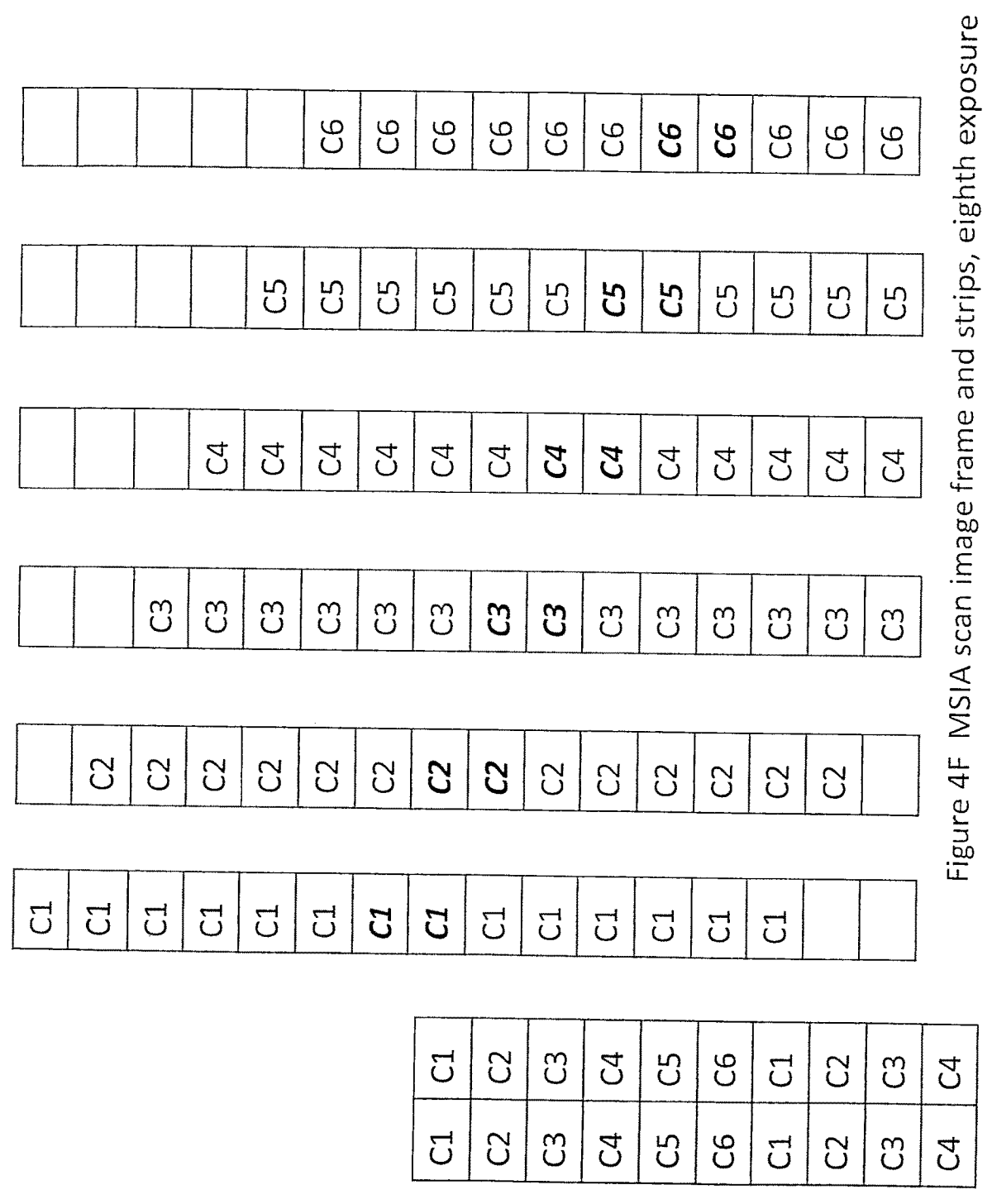

FIG. 4 shows how data is collected and strip images are assembled during MSIA scan using a scanning hyperspectral colour filter example in which the repeat pattern is 6 rows, and the active area is 12 rows by 4000 columns. (a simplified version of that shown in FIG. 1). FIG. 4A shows a schematic view of the filter on the left (although shown as only 2 columns wide in this diagram, this is meant to show a filter and area detector that is 4000 columns wide (in this example). On the right side of the diagram, six image strips, one for each colour in the filter array, also represent image strips that are 4000 pixels wide. After the first exposure, frame grabber 250 transfers image data from all 12 rows of the area detector (this is the first frame image) to computer 206 which records six image strips, one for each colour in the scan filter array, as shown on the right side of FIG. 4A. As the scanning stage moves a distance that moves the image of the specimen (projected by the microscope optics onto the area detector) a distance equal to the distance between rows of pixels in the area detector, a second exposure is made and this image data is passed to computer 206 by frame grabber 250, and is added to the data already stored in the image strips, as shown in FIG. 4B. FIG. 4C shows the result after the third exposure. After the sixth exposure (FIG. 4D), each of the rows in the lengthening image strips have been exposed once. After the seventh exposure (FIG. 4E), one of the rows in each of the lengthening image strips has been exposed twice (shown by bold italic letters) and the data stored in each of these positions in computer memory is an average of (or the sum of) the two measurements that have been completed for each of the pixels in these rows of the strip images. After the eighth exposure (FIG. 4F) two of the rows in each on the lengthening image strips have been exposed twice. After the twelfth exposure (shown in FIG. 4G), the twelfth row in each of the strip images has been exposed twice (the Repeat Pattern in this simple example is 2) and the data stored in row 12 in each of the six image strips is now complete. At this time the data in rows 1-11 can be discarded, and row 12 becomes the first completed row (imaged twice in this example which has a Repeat Pattern of 2 rows) of the lengthening scan image strips, and every exposure from this time on will add a completed row to the six image strips. In this simple example, each pixel has been exposed twice, so the signal/noise ratio improvement is only equal to the square root of 2, or 1.4. In a more realistic example, like the example with 8 colour filters and an active area of 256 rows, each pixel will be averaged 32 times for a signal/noise ratio improvement of the square root of 32, or 5.6.

Figure 5:
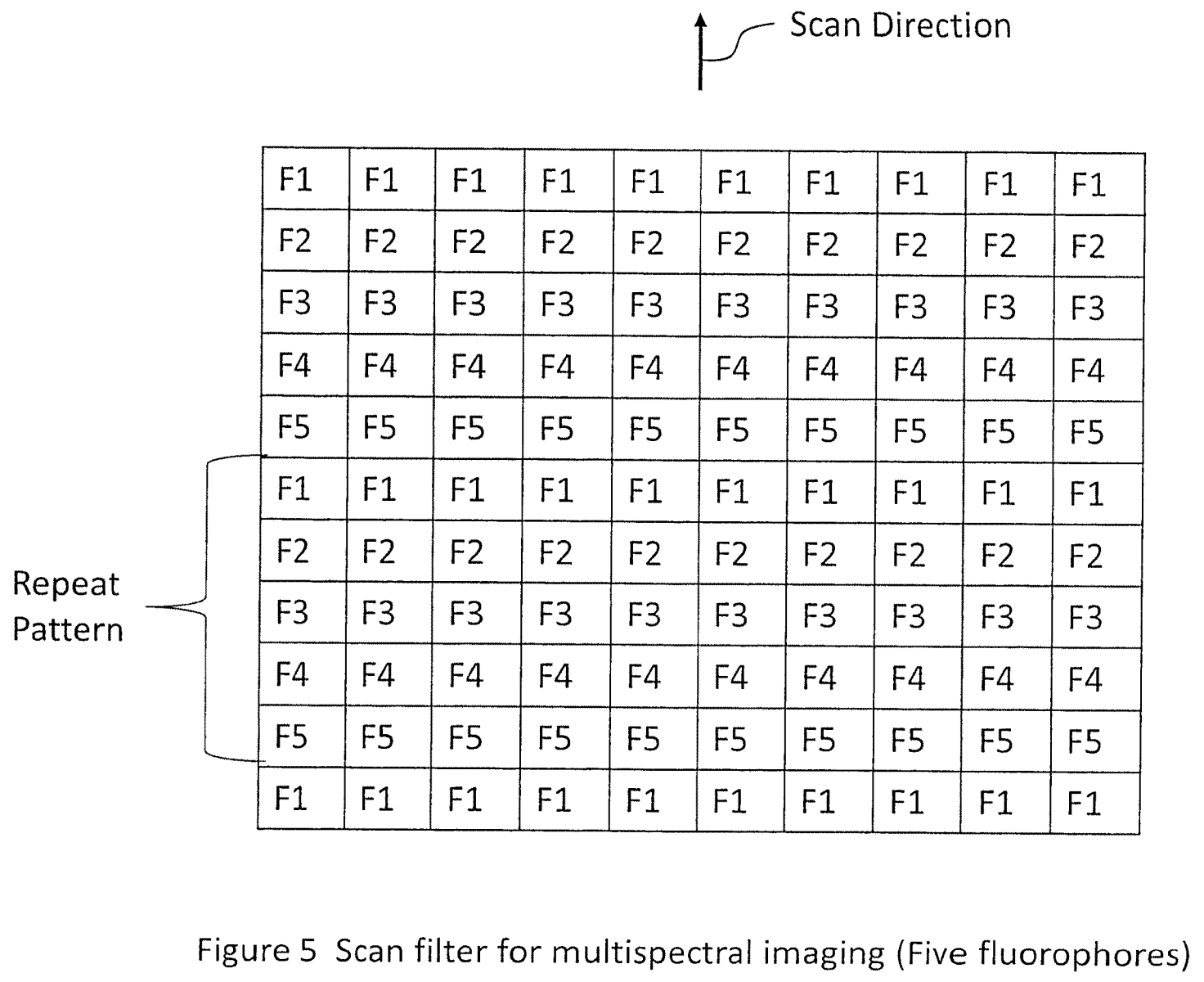

FIG. 5 shows a schematic representation of a scan filter for fluorescence imaging (multispectral imaging) that is a third embodiment of this invention. This example of a scan filter is designed for fluorescence MSIA imaging of a specimen that contains up to five fluorophores, F1 through F5. In this example, the Repeat Pattern has five rows. Since the emission bands of fluorophores have different bandwidths, and each row contains an emission filter for a specific fluorophore, this filter does not produce a spectrum of the light emitted from each pixel position, but instead measures the intensity of the fluorescence emitted from each pixel position for each of five (or up to five) fluorophores when illuminated by a light source with a frequency or range of frequencies chosen to excite some or all of the fluorophores in the specimen. The fluorescence imaging scan filter can be designed for a specific specimen, where each row of pixels in the Repeat Pattern is fabricated with an emission filter that matches a known fluorophore in the specimen, or for general purpose imaging, where the filter can be designed such that each row of pixels in the Repeat Pattern is fabricated with an emission filter that matches one of several popular fluorophores. The Repeat Pattern number can also be varied.

FIG. 6 shows a schematic representation of a fluorescence MSIA scanner (a multispectral scanner) that is a fourth embodiment of this invention. Light from light source 680 (which may be controlled manually or by computer 660) is partially reflected by beamsplitter 630 and illuminates an area of the surface of fluorescence microscope specimen 602, which is mounted on microscope slide 201 on moving microscope stage 205. This kind of illumination, where the light illuminating the specimen comes from above the specimen, is called epi-illumination (epi-illumination can also be provided using other arrangements, for one example see the light source 213 as shown in FIG. 2). Both the illumination intensity and wavelength produced by light source 680 are controlled by computer 660 (or can be controlled manually). Motion of the microscope stage is in a direction perpendicular to rows in the area detector. Light emitted by or reflected from the specimen is collected by microscope objective 215, is partially transmitted by beamsplitter 630, and is focused by tube lens 225 onto area detector 211, which is covered by a scanning fluorescence colour filter array 612 like that shown in FIG. 5. Data from the area detector 211 is read out by frame grabber 250 and passed to computer 660 where an image strip is assembled for each fluorophore represented by the filters in the Repeat Pattern of the fluorescence imaging scan filter (multispectral imaging scan filter.) Image data for each exposure is passed by the frame grabber to the computer where it is added to or averaged with data already present in the lengthening image strips in the Moving Specimen Image Averaging (MSIA) process. Note that the averaging calculation for each colour in the multispectral scan filter can be different, which allows the gain for each colour to be adjusted to adjust the response of this fluorescence scanner for each fluorophore (some fluorophores are much brighter than others).

When a particular fluorophore is not present in the specimen, or is not excited by the light produced by light source 680, data from that row in the detector is discarded by the computer, and no strip image is created for that fluorophore. After completion of a scan along one strip of the specimen, if a fluorophore contained in the specimen has not been excited by the illumination intensity and wavelength produced by the light source, the illumination intensity and/or wavelength of the light source can be adjusted by computer 660 (or manually), and the scan along that strip of the specimen repeated to generate a fluorescence strip image for that fluorophore. Finally, the image strips can be combined to produce a false colour image of the fluorescence in the specimen, and if required, this false colour image can be adjusted to match the colours that a microscopist is used to seeing when viewing that particular specimen and fluorophore through a fluorescence microscope. The combined false colour strip images can be assembled to produce a final image of the entire specimen (or an area of interest), or the single-fluorophore image strips can be assembled to produce single-fluorophore images (often presented in greyscale or a monochrome that represents the perceived colour of that fluorophore) of the entire specimen or of an area of interest.

FIG. 7 shows a schematic representation of a scan filter for both Hyperspectral and RGB imaging that is a fifth embodiment of this invention. This example is a scan filter for MSIA imaging with a Repeat Pattern of 9 rows (in this example) that are repeated across an entire surface of an active area of the area detector. Six of the 9 rows of the area detector are covered with bandpass filters that transmit a narrow spectral range. For hyperspectral imaging, the bandwidth of each filter is the same, including substantially all of the wavelength range between the filters in adjacent rows in the repeat pattern, with no overlap between filters. The entire bandwidth of the hyperspectral filter and the number of different rows of separate filters is chosen to match the application, usually covering a range of wavelengths in the visible, but sometimes including wavelengths in the near UV or the near IR. The additional 3 rows in the Repeat Pattern are covered with Red, Green and Blue filters as shown, which will enable this combination filter to be used for RGB imaging in addition to hyperspectral imaging.

When the hyperspectral MSIA scanner shown in FIG. 2 is configured for photoluminescence imaging, epi-illumination source 213 (or other epi-illumination source) illuminates specimen 202 with a wavelength of light chosen to cause photoluminescence in specimen 202. The photoluminescence emission is captured by microscope objective 215 and focused onto area detector 211 (which now includes the hyperspectral scan filter shown in FIG. 7). Frame grabber 250 captures a frame image every time the shutter closes in the MSIA process and passes that frame to computer 206. In this case, the computer discards the data from the top three rows of the Repeat Pattern and sets up six strip images using the MSIA process, one for each of the six hyperspectral filter rows. These six strip images are combined by computer 206 to produce a single hyperspectral strip image, where each pixel in the strip image contains the information for a spectrum comprised of six components, each with spectral width equal to ⅙ of the total width of the spectrum detected by the six hyperspectral filter components. A second scan can then be performed along the same strip in the specimen, in which epi-illumination source 213 is configured to produce white light illumination (for reflected light imaging of the specimen) or transmission illumination source 210 is configured to illuminate the bottom of the specimen with white light for imaging in transmission. As the scan proceeds, the computer discards information from the bottom six rows of the repeat pattern in the scan filter, and sets up an RGB image strip (using the method described above for creating a single hyperspectral strip image). In this case the repeat pattern is 9 rows, so with an active area of 108 rows (for example) on the area detector, all of the pixels in the final strip images will have been exposed 12 times, resulting in an improvement in Signal/Noise ratio due to MSIA averaging of square root of 12, or 3.4. The RGB strip image is registered with the hyperspectral strip image, and the two can be combined into a single strip image, where an RGB image of the specimen can be displayed and the photoluminescence spectrum (for example) can be retrieved and displayed for any pixel in the RGB image. If the light source is controlled by the computer, the scanner can be configured to first scan one strip image (the RGB strip image, for example) and then reconfigure the illumination and scan a second strip image (the hyperspectral strip image) of the same strip across the specimen, then move to the next strip position on the specimen, and continue scanning, until the whole specimen has been scanned. At that time, a combined RGB and hyperspectral image of the entire specimen can be assembled.

FIG. 8 shows a schematic representation of a scan filter for both fluorescence (multispectral) and RGB imaging that is a sixth embodiment of this invention. This example is a scan filter for MSIA imaging with a Repeat Pattern of 9 rows that are repeated across an entire surface of an active area of the area detector. In this example, five of the 9 rows of the area detector are covered with bandpass filters that transmit a range of wavelengths of light chosen to match the emission spectra of five fluorophores in the specimen (or five common fluorophores, when used for general-purpose fluorescence imaging). (A different choice can be made for both the number and choice of fluorophores to be included in the scan filter.) The additional 4 rows in the Repeat Pattern (in this particular example) are covered with Red, Green, Blue and White (clear) filters as shown, which will enable the filter to be used for RGB and greyscale imaging in addition to multispectral imaging. The clear (White) filter transmits all of the light falling on that row of pixels, so the greyscale image will be the brightest and is particularly useful for fluorescence imaging because it shows the sum of all the fluorescence emitted by the specimen. Because it is bright, it is also useful for focusing in both brightfield and fluorescence.

When the multispectral MSIA scanner shown in FIG. 6 is configured for fluorescence imaging, epi-illumination is provided by light source 680 and beamsplitter 630 (or other epi-illumination source), illuminating specimen 602 with a wavelength of light chosen to cause fluorescence in specimen 602. The fluorescence emission is captured by microscope objective 215 and focused onto area detector 211 (which is now covered by the area detector shown in FIG. 8) by tube lens 225. Frame grabber 250 captures a frame image every time the shutter closes in the MSIA process and passes that frame to computer 660. In this case, the computer discards the data from the top four rows of the Repeat Pattern and sets up five strip images using the MSIA process, one for each of the five fluorescence filter rows. In some cases, only a smaller number of fluorophores will be excited by the illumination wavelength chosen, and the computer also discards the data from rows that represent these unexcited fluorophores. After the scan along the strip is completed, a different epi-illumination wavelength is chosen by computer 660 to excite fluorophores that were not excited in the first scan, and the scan is repeated, resulting in a strip image containing image data from each of the fluorophores excited by the new epi-illumination wavelength. This process is repeated until the fluorescence strip image stored in computer 660 contains image data from all of the fluorophores in the specimen (or all the fluorophores excited by the illumination wavelengths chosen). These strip images are combined by computer 660 to produce a single fluorescence strip image, where each pixel in the strip image contains image data for each of the fluorophores excited in the previous scans. An additional scan can then be performed along the same strip in the specimen, in which epi-illumination source 680 is configured to produce white light illumination (for reflected light imaging of the specimen) or a transmission illumination source (like illumination source 210 in FIG. 2) is configured to illuminate the bottom of the specimen with white light for imaging in transmission. As the scan proceeds, the computer discards information from the bottom five rows of the repeat pattern of the scan filter (the rows configured for detecting fluorescence), and sets up an RGB image strip and a greyscale image strip (using data from the W row). Finally, the computer assembles a composite image strip which contains the image data for the fluorophores and for the RGB colour image of the specimen, as well as the greyscale image acquired using the White (transparent) filter row. This image information can be displayed several ways—as an RGB image of the specimen with a fluorescence image containing the data from one or more fluorophores displayed beside it, or as a greyscale image with fluorescence images beside it.

One alternative for using this scan filter is to use the White row to detect fluorescence from the specimen when the epi-illumination is configured to excite multiple fluorophores. In this case the fluorescence detected is for a broad band of wavelengths, so multiple fluorophores will be detected simultaneously, and since all of the light is transmitted through a clear (W) filter, this method is very sensitive. In this case the computer can assemble the final image strip to contain the RGB colour brightfield image of the specimen in addition to a broadband greyscale fluorescence image as well as images for separate fluorophores. After additional scans along adjacent strips across the specimen, these strip images can be assembled by computer 660 to construct an image of the whole specimen that contains brightfield colour image data as well as greyscale broadband fluorescence image data and image data specific to one or more fluorophores. These images can be displayed in several different ways to show the fluorescence image data registered with a colour brightfield image of the specimen.

A second alternative for using this scan filter is to use the White (clear) row in the filter to detect a fluorophore or other fluorescence source whose emission filter is not included in the multispectral filter array. This can be accomplished by illuminating the specimen with light that will excite the fluorophore or other fluorescence source using light source 680 and beamsplitter 630, and inserting an emission filter for that fluorophore into the microscope between beamsplitter 630 and tube lens 225. When this combination is used, the detector pixels under the White (clear) rows of the filter array will detect fluorescence from this source.

Figure 9:
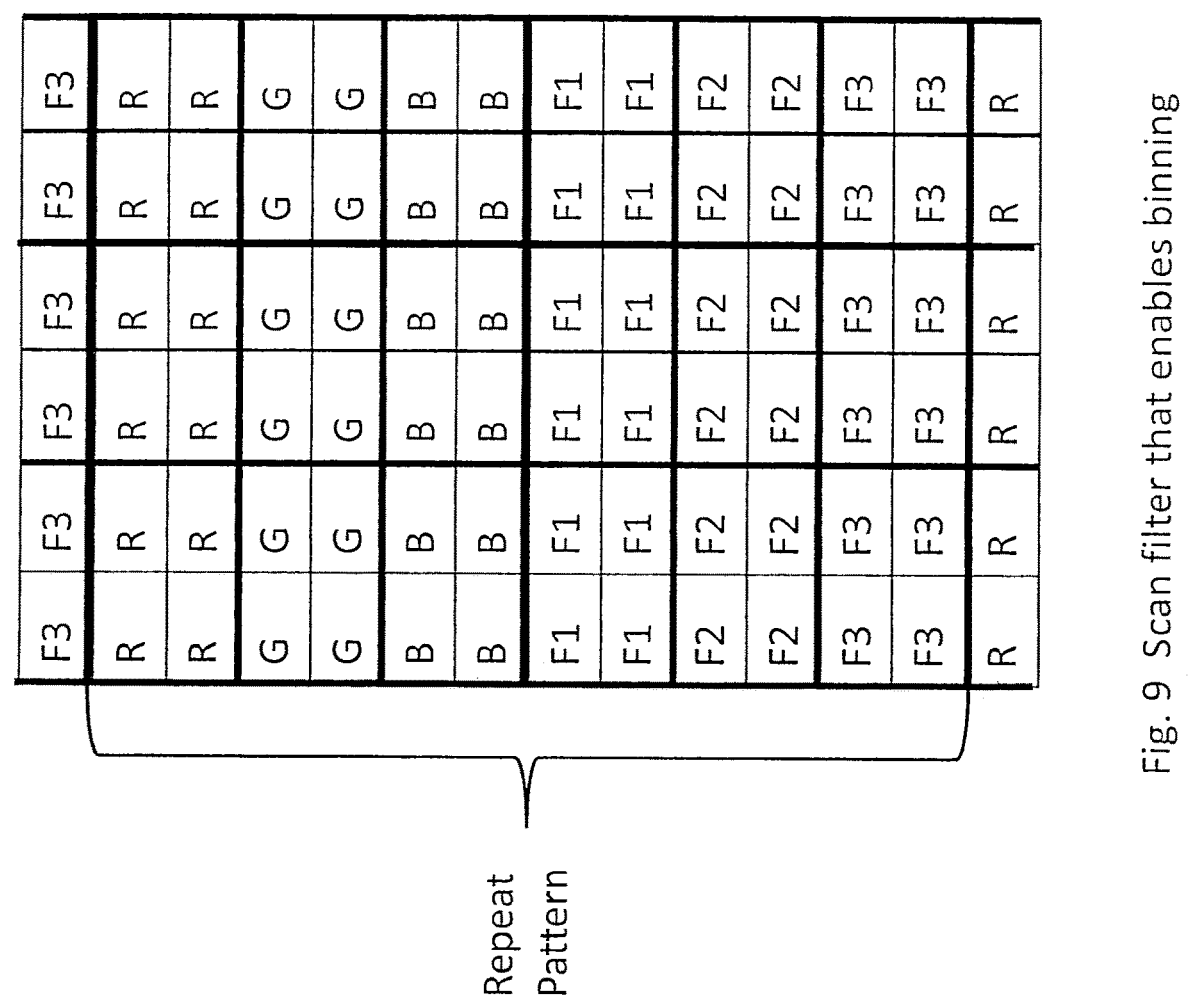

FIG. 9 shows a schematic representation of a scan filter for fluorescence (multispectral) and RGB imaging that is a seventh embodiment of this invention. This example (one of many combinations and possibilities) is a scan filter for MSIA imaging with a Repeat Pattern of 12 rows that are repeated across an entire surface of an active area of the area detector. In this example, six of the 12 rows of the area detector are covered with bandpass filters that transmit a range of wavelengths of light chosen to match the emission spectra of three fluorophores, but in this example there are two rows for each fluorophore. The additional 6 rows in the Repeat Pattern (in this particular example) are covered with Red, Green, and Blue transmission filters, again with each filter covering pairs of adjacent rows. This type of scan filter is designed to take advantage of a common feature of area detectors called "binning". When 2×2 binning is activated in an area detector, it essentially combines the output of the array into a single output for every four pixels in a 2×2 grid. When used for MSIA scanning, the shutter opens and closes and the frame grabber reads data from the array and passes that data to the computer during the time the image projected on the area detector moves a distance equal to the distance between two rows of pixels, and each 2×2 pixel area in the array is treated as a single pixel, which enables faster scan speed and improved signal/noise ratio, but with reduced resolution. When better resolution is required, the full resolution of the array can be achieved by MSIA scanning in which the shutter opens and closes and data is acquired from the array by the frame grabber each time the image moves a distance equal to the distance between pixels in the array, which is the normal situation in MSIA scanning.

A hyperspectral scan filter to enable binning (an eighth embodiment) can also be designed with pairs of rows covered with filters that transmit a narrow spectral range, and where the bandwidth of the hyperspectral filter is equal to the sum of the bandwidths of the separate bandpass filters on each of the pairs of rows covered by the bandpass filters in the repeat pattern, and where other features in the array, for example R, G and B rows are also in pairs. When 2×2 binning is used in MSIA scanning with this filter, scan speed can be increased, there is increased signal/noise ratio in the resulting hyperspectral image, but resolution is decreased. As just described when binning was used with a fluorescence (multispectral) scan filter, when better resolution is required, MSIA scanning with the hyperspectral filter can achieve high resolution by treating the rows as separate rows in the MSIA process, opening and closing the shutter and transferring image data each time the image moves a distance equal to the distance between rows of pixels in the area detector.

Several other filter designs can be used for MSIA scanning. For example, a diagonal format RGB filter is shown in FIG. 10. Here the Repeat Pattern is 3 rows, and in this example an active area of only 6 rows is used to illustrate how the data builds up in the single-colour strip images during scanning, as shown in FIG. 11. Only five pixels are shown in each row for this illustration, however the pattern in each row is continued across the width of the detector. FIG. 11A (top) shows data being loaded into the colour strip images after the first exposure, and (bottom) shows the data contents of the colour strip images after the second exposure (the strip images have moved upwards relative to the area detector by one pixel). FIG. 11B shows the strip images after the third exposure, and FIG. 11C after the fourth exposure. Note that here some pixels have been exposed twice. This is shown using bold italic letters. FIG. 11D shows the data in the Single Colour Strip Images after six exposures. At this time (when the repeat pattern is 3 rows and the active area is 6 rows) the sixth row in the strip images is exposed twice, and that data can be exported to form the first row of an RGB strip image. As the scan progresses, data in the colour strip images opposite the last row of the active area of the detector (the top row in this diagram) is completely exposed (in this example, twice, but more generally exposed a number of times equal to the number of rows in the active area of the detector divided by the number of rows in the repeat pattern of the scan filter) and can be exported to the next row of the lengthening MSIA strip image.

A diagonal filter layout can also be used for hyperspectral and multispectral imaging.

FIG. 12 shows a schematic representation of an MSIA scanner for spectrally-resolved imaging that can also acquire Single Field of View images using a spectral imaging scan filter like those described in this document (designed for multispectral or hyperspectral imaging and sometimes including R, G and B and/or W rows) which is a ninth embodiment of this invention. When acquiring single field of view images, the active area of the area detector is the entire area of the area detector. For Single Field Of View images, the filter pattern is repeated across the entire surface of the area detector. When used for fluorescence or photoluminescence imaging, light from epi-illumination source 213 illuminates specimen 1202 mounted on microscope slide or specimen holder 1201, which is mounted on computer-controlled single-axis scanning stage 1210, which is mounted on computer-controlled dual-axis scanning stage 205. Computer 1260 controls scanning stage 205 through wired or wireless connection 207, and controls scanning stage 1210 through wired or wireless connection 1202. Scanning stage 1210 moves in a direction perpendicular to rows in the area detector, the same direction that scanning stage 205 moves in when it is scanning a strip across the specimen (as shown by the horizontal (left-right) arrows to the left of each scanning stage in the diagram). Light from light source 213 illuminates an area of the surface of microscope specimen 1202, which is mounted on microscope slide or specimen holder 1201 on scanning microscope stage 1210. This kind of illumination, where the light illuminating the specimen comes from above the specimen, is called epi-illumination (epi-illumination can also be provided using other arrangements, for one example see the light source 680 and beamsplitter 630 shown in FIG. 6). Light emitted by or reflected from the specimen is collected by microscope objective 215, and is focused by tube lens 225 onto area detector 211 which is covered by scanning colour filter array 1220 (inside digital camera 1230), where the scanning colour filter array covers the entire surface of the area detector. When used for MSIA scanning of strips across the specimen, scanning stage 1210 remains stationary in a single position, and strip scanning is accomplished using scanning stage 205. MSIA scanning is accomplished using the repeat pattern of the filter array and an active region of interest in the area detector as described earlier in this document. Data from the active region of interest in area detector 211 is read out by frame grabber 250 and passed to computer 1260 where an image strip is assembled for each colour represented by the filters in the Repeat Pattern of the spectral imaging scan filter. Image data for each exposure is passed by the frame grabber to the computer where it is added to or averaged with data already present in the lengthening image strips in the Moving Specimen Image Averaging (MSIA) process, as described earlier in this document. When scanning of a strip is completed and the strip image has been calculated and assembled, scanning stage 205 moves in a direction perpendicular to the scan direction (shown by the arrow pointing into and out of the diagram to the left of scanning stage 205) to a position centred on an adjacent strip to be imaged on the specimen, and a second strip is scanned. This procedure is continued until the entire specimen has been scanned (or the area of a region of interest on the specimen has been scanned).

When a feature of interest has been identified in the scanned MSIA image, scanning stage 205 is controlled by computer 1260 to move the feature of interest to the centre of the field of view of microscope objective 215, and scanning stage 205 is held stationary at this position. At this position, an image of the portion of the specimen inside the field of view of the microscope optics is projected onto area detector 211 that is covered by scanning colour filter array 1220. A spectrally-resolved single-frame image of that portion of the specimen can be acquired as follows: With scanning stage 205 held in a stationary position, and using the entire area of the area detector as an active area, a first image of the specimen is acquired by opening and closing the shutter. This image contains rows of data that match the rows of the scan filter array, repeated across the whole field of view of the microscope. As an example, see FIG. 13A. The left side of FIG. 13A shows the repeat pattern of a scanning array detector which is covered by rows of transmission filters. In this example, R, G and B rows are followed by three rows each covered by an emission filter for a different fluorophore, F1, F2 and F3. This repeat pattern of 6 rows covers the entire surface of the area detector. In order to use less space in the diagram, the left strip shows only two pixels in each row, however this represents rows that are the entire width of the detector. As an example, consider an area detector that is 4000 pixels wide (rows are 4000 pixels long) and 3000 pixels high (there are 3000 rows), and the entire area detector is covered with a scanning filter array that has 3000 rows that are 4000 pixels long.

Data is read from the entire area detector—a smaller active area is not used. Each frame image is represented by a strip that is shown as one pixel wide, however each of the image frames is 4000 pixels wide, and there are six image frames (one for each row in the repeat pattern). The first exposure is made of the specimen by opening and closing the shutter without moving stage 1210. After the first exposure, the frame grabber transfers data from the entire image to computer 1260 and data from each row in the detector is stored in the image frame row that corresponds with that colour filter. The Scan Direction arrow (top left) shows the relative motion of the projected image across the area detector. This diagram shows the area detector moving downward while the frame images are stationary, however it is also possible to represent the process by showing a stationary area detector with the six image frames moving upwards on the diagram. For this representation, consider the F3 row at the top of the detector on the left side of the diagram to be the first row of pixels at the top of the detector, and the row below it on the diagram are the first few rows of the 3000 rows on the detector. When the first exposure is made, the data from that exposure is stored in the six image frames as shown. Stage 1210 moves specimen 1202 a distance equal to the distance between pixel positions on the specimen and stops, and a second exposure is made. Data acquired during the second exposure is passed by frame grabber 250 to computer 1260 which then stores this data in the six image frames (see FIG. 13B). Stage 1210 again moves specimen 1202 a distance equal to the distance between pixel positions and stops. A third exposure is made and the data stored in the six image frames (see FIG. 13C). The specimen is moved a third time, a fourth exposure is made and the data is stored in the image frames. The specimen is moved a fourth time, the fifth exposure is made and the data is stored in the image frames. The specimen is moved a fifth time, the sixth exposure is made and the data is stored in the image frames, as shown in FIG. 13D. This is the last exposure that is necessary—the image frames starting at row 6 now each contain a complete image of the specimen filtered through their respective transmission filters. The first frame (the F3 frame in the diagram) contains a full field of view image of the specimen (minus 5 rows at the top and 5 rows on the bottom, or 2990 rows). Each of the other images is the same, and all six images are perfectly registered with one another after the top and bottom five rows are discarded. When the scanning colour filter array has a Repeat Pattern of N rows, each Single Field of View scan will require N-1 steps, with N exposures, and there will be N image frames, each of which will result in a Single Field of View image filtered through the transmission filter covering the corresponding rows in the scanning colour filter array.

Since N image frames are required to complete each Single Field of View image, scan filters with only one row per filter colour are preferred over scan filters with two or more rows per filter colour when used for single field of view imaging.

Scanning microscopes are often designed to have a resolution such that the "actual pixel" resolution shown on the computer screen is 0.25 microns or better. For example, that resolution can be achieved in a scanner using a 20× microscope objective with a numerical aperture of 0.75 or better (to achieve the 0.25 micron resolution on the specimen) and a working distance of 1 mm (so focus changes do not cause the objective to hit the specimen during scanning). With a 20× objective, this matches an n with 5 micron pixels, which are readily available. When performing Single Field of View scanning using this combination of microscope objective and area detector, each step motion of stage 1210 is 0.25 microns, and for very high resolution imaging the accuracy and repeatability of motion should be better than 0.025 microns, which is a stringent requirement. The range of motion can be quite small, because even for Repeat Patterns as large as 256 rows, the range of motion is only 64 microns, which is less than 0.1 mm. One type of stage that meets these requirements is the piezo stage, which has a very small range of motion, but both the range of motion and the accuracy and repeatability meet these requirements. Motor-driven stages generally have a much larger range of motion, but do not have the accuracy and repeatability necessary for this application. If a motor-driven stage is found that meets these requirements, or if the requirements are relaxed because of reduced resolution, then a separate stage will not be required for Single Field of View scanning, and stage 205 can be used for both MSIA and Single Field of View scanning.

Single Field of View scanning has several features. First, the separate image types (in this example, R, G, B and F1, F2, F3 can be acquired separately by making two scans from the same starting position of stage 1210, one for R, G, B and one for F1, F2, F3, using white light epi or transmission illumination for R, G, B imaging and a narrow band epi-illumination wavelength for fluorescence imaging (separate repeat scans can be made for each fluorophore using different excitation wavelengths if required). In this case, when the first scan is made to image R, G, B, the data acquired by the detector for F1, F2, F3 (which are not illuminated correctly) are discarded, and then in a second scan where illumination is correct for fluorescence imaging but not for RGB imaging, the data for RGB are discarded and that for F1, F2, F3 are recorded in the appropriate image frames. This way two scans are used to record 6 images using two different illuminations.

Alternatively, instead of multiple scans, multiple exposures using different light sources matched with specific rows in the colour filter array or with external filters and a White row in the colour filter array can be made at each stage position when performing single field of view scanning, so that all of the images at each stage position will be perfectly aligned and registered and only one scan is required.

Second, since only N-1 steps are required to acquire a complete image, and stage 1210 stops at each position, exposure time can be increased when the signal strength is low (for example for fluorescence imaging when compared to brightfield RGB imaging).

Third, the same camera with an RGB and spectral imaging scan filter can be used to image RGB specimens in both MSIA scanning and Single Field of View scanning (by discarding information from the detector rows dedicated to spectral imaging) and can be used for imaging fluorescence or photoluminescence specimens in both MSIA scanning and Single Field of View scanning by discarding information from RGB rows in the detector.

Fourth, since more than one Single Field of View image can be acquired from the same starting point for stage 1210, a series of images can be acquired at different focus depths in the specimen, resulting in a 3 dimensional image stack.

Fifth, by moving stage 1210 to a new position using stage 205, Single Field of View images can be acquired of adjacent areas of the specimen that can be stitched together to provide an image of an area of the specimen that is larger than a single field of view. If Single field of View images are acquired at different focus depths and then adjacent areas are imaged in the same way, since the focus stack images are registered with each other in each stack, it is easy to stitch together the images stack-by-stack to provide a three dimensional image of an area of the specimen that is larger than a single field of view.

Sixth, when using a combined RGB and spectral imaging scan filter, each of the stacked 3D images contains perfectly registered RGB and spectrally-resolved images in each image plane in the stack.

FIG. 14 shows a schematic representation of an MSIA scanner for spectrally-resolved imaging that can also acquire Single Field of View images using a spectral imaging scan filter like those described in this document (designed for multispectral or hyperspectral imaging and sometimes including R, G and B and/or W rows) where the area detector 211 with spectral imaging scan filter 1415 is mounted on a scanning stage 1420 inside digital camera 1430 which is a tenth embodiment of this invention. In this embodiment, during MSIA scanning stage 1420 is held in a fixed position while computer 1460 controls scanning of stage 205 in a direction shown by the horizontal left-right arrow to the left of stage 205. This scan direction is perpendicular to the rows in area detector 211. During MSIA scanning, an active area is defined in area detector 211 and data is passed to computer 1460 to assemble MSIA strip images as described earlier.

When a feature of interest has been identified in the scanned MSIA image, scanning stage 205 is controlled by computer 1460 to move the feature of interest to the centre of the field of view of microscope objective 215, and scanning stage 205 is held stationary at this position. At this position, an image of the portion of the specimen inside the field of view of the microscope optics is projected onto area detector 211 that is covered by a scanning colour filter array 1415. A spectrally-resolved image of that portion of the specimen can be acquired as follows: With scanning stage 205 held in a stationary position, and using the entire area of the area detector as an active area, an image of the specimen is acquired by opening and closing the shutter. This image contains rows of data that match the rows of the scan filter array, repeated across the whole field of view of the microscope. Using the same spectral imaging scan filter that was used in the description of the instrument shown in FIG. 12 as an example, a first frame image is acquired and transferred to the six image frames shown in FIG. 13A. In this case, instead of moving the specimen on a stage mounted on scanning stage 205, the area detector 211 covered with spectral imaging scanning colour filter array 1415 is moved a distance equal to the distance between rows of detector pixels in the array to a new position where a second frame image is acquired and passed to computer 1460. The difference between the instrument shown in FIG. 14 and that shown in FIG. 12 is that in the instrument shown in FIG. 14 the specimen is stationary during Single Field of View scanning, but the area detector moves, while in FIG. 12 the specimen moves and the area detector is stationary. Otherwise, image frame data is collected and image frames are assembled in the same way in the two instruments through relative motion of the image of the specimen and the area detector. After five steps a single frame image of the specimen is complete for all six colour transmission filters in the array used in this example, with the same result as shown in FIG. 13D.

For this example, we use the same specifications for a scanning microscope as was discussed earlier in this document ("actual pixel" resolution 0.25 microns, 20× microscope objective with a Numerical Aperture of 0.75 or larger, and an area detector having 5 micron pixels). When performing Single Field of View scanning using this combination of microscope objective and area detector, and using scanning stage 1420 to move area detector 211 instead of moving the specimen as in the previous example, each step motion of stage 1420 is 5 microns, and for very high resolution imaging the accuracy and repeatability of motion should be better than 0.5 microns, which is a not nearly as stringent a requirement as before. The range of motion is larger than before, because for a large Repeat Patterns of 256 rows, the range of stage motion required is 1280 microns, or 1.28 mm. Several types of motorized stages meet these requirements, including piezoelectric stages and stages with linear motors, stepping motors and others. Moving the stage to the next position, stopping and exposing an image while the area detector is stationary will provide the best resolution, but it is also possible to move the stage at constant speed, opening and closing the shutter and transferring image data to the computer in the time it takes for the stage to move a distance less than the distance between pixels (5 microns in this example), but this may result in some motion blur in the image.

Moving the area detector instead of moving the specimen when acquiring Single Field of View scanned images has several advantages. First, the requirements for motion of the detector and repeatability are much less stringent than for moving the specimen, so several choices are available for moving stages and cost for the stage will be less. Second, because the available stages have better specifications than the minimum required, performance will likely be more robust over time.

FIG. 15 shows a schematic representation of an digital scanning Single Field of View camera 1501 for use on a microscope (or other optical instrument where single field of view images are acquired) that acquires Single Field of View images using a spectral imaging scan filter like those described in this document (designed for multispectral or hyperspectral imaging and sometimes including R, G and B and/or W rows) where the area detector 211 with spectral imaging scan filter 1410 is mounted on a scanning stage 1420 inside digital camera 1430 which is an eleventh embodiment of this invention. Computer 1560 is programmed to control scanning stage 1420 through wired or wireless connection 1440, acquire frame images using frame grabber 1450, and as the scan proceeds, assemble frame images for each filter in the repeat pattern, and when the scan is complete to display these spectrally-resolved images on a computer monitor. It is expected that this scanning Single Field of View camera, including the computer and frame grabber, can be assembled as a single package that can be mounted directly on the camera port of a microscope or other optical instrument.

FIG. 16 shows a schematic representation of a microscope with digital Single Field of View camera attached. Microscope specimen 1202 on microscope slide 201 is mounted on manual X-Y positioning microscope stage 1601 and is illuminated by transmission light source 210 or epi-illumination source 213, as required. Light emitted by or reflected from specimen 1202 is collected by microscope objective 215 which is focused on the specimen by manual focus mount 1620 and this light is focused on area detector 211 which includes a spectral-imaging scan filter 1415. The specimen can be viewed through the microscope's eyepieces (not shown) for focusing and to find a feature of interest to display, or the digital scanning Single field of view camera can be programmed to continuously display images of the specimen on a computer monitor while focusing and finding an area of interest on the specimen. When the instrument is focused on the area of interest, computer 1560 can be programmed to display a spectrally-resolved image of the specimen, as well as registered RGB and Greyscale images of the same area (depending on which spectral-imaging scan filter is present on area detector 211). Scanning Single Field of View camera 1501 enables this basic microscope to be used for RGB and/or Greyscale and multi-fluorophore imaging, or RGB and/or Greyscale and hyperspectral imaging, depending on which spectral-imaging scan filter is present on area detector 211, and each of these combinations can be achieved with only one camera, and all images are perfectly registered with each other.

The white (clear) rows in a scan filter allow all of the light that is incident on the detector to reach the pixels in the row beneath the clear filter. When exposure time is increased to increase signal strength in other rows of the detector, this may cause pixels in the white rows to be overexposed and can cause blooming. As a result, charge may overflow the white row and interfere with image data in the adjacent rows. This effect can be minimized by adding rows on either side of the white row that are covered with black (opaque) filter material making those rows inactive, so that blooming from the white row will not reach the active rows on either side. This means the W row is still available with high sensitivity when used with a separate emission filter for a fluorophore whose emission filter is not included in the spectral imaging scan filter. Adding additional rows to the scan filter will increase the length of the Repeat Pattern so this must be accounted for when performing both MSIA and Single field of view scanning.

Alternatively, instead of using a clear filter in the white rows, a neutral density filter could be used which can be chosen to make the signal strength in this row similar to that in the R, G and B rows when illuminated by white light.

Several exposures, each using a different modality, can be made each time the stage stops (and data from these exposure modalities can be combined with data from other exposure modalities since the resulting images will be perfectly registered and aligned):

a. RGB brightfield imaging in transmission or reflection
    b. Fluorescence imaging using filters in the scan filter (using appropriate epi-illumination to excite fluorophores)
    c. Fluorescence imaging using an additional emission filter added to the optical train between the microscope objective and the tube lens plus using the W (clear) filter in the scan filter, plus using appropriate epi-illumination
    d. Light that does not excite fluorophores in the specimen (e.g. infrared) can be used in transmission when using the clear filter to provide a reference image of specimen structure for some specimens A neutral density filter can be used in place of a clear filter to reduce the signal strength in the W row to match the signal strength of the RGB rows during RGB imaging.

If the signal strength in the W (clear) row is so large that it causes blooming, adding rows on either side covered with an opaque filter will protect nearby rows from signal overflow from the W row. A clear filter is a transparent filter.

An MSIA filter can have multiple adjacent rows of each colour repeated inside the repeat pattern as long as the repeat pattern is not larger than the width (the number of rows) of the active area on the detector. Where each colour has the same number of adjacent rows. This will also work for FOV scanning, however single rows of each colour are more appropriate here because that reduces the scan distance that the detector moves (in a moving-detector FOV scanner) and the distance the specimen stage moves (in a specimen stage FOV scanner). In both cases the same accuracy and repeatability of motion is required, and the area of the specimen being imaged must stay inside the field of view of the microscope objective. For example, where there are two adjacent rows of each colour, for FOV imaging, the scanner can be controlled to take images of every second line of the repeat pattern.

When a scan filter has a repeat pattern of N pairs of adjacent rows (where the repeat pattern is 2N rows in length), where each pair has the same filter colour, N image frames will be required to complete a single-FOV scan, but the distance the detector moves between exposures will now be equal to the distance between 2 rows of pixels in the detector (and so on with N triples of rows; or N repeats of 4 rows for a repeat pattern that is 4N long; or more etc.)

The kind of image acquired using a white (clear) filter is usually called a greyscale image, however it may be more appropriate to call it a panchromatic image since all wavelengths in the spectrum pass through a clear filter.

When used for Moving Spectral Image Averaging (MSIA) scanning, the repeat pattern has to be projected across an entire surface of the active area of the detector, but not the entire area of the detector.

When used for Single Field Of View (SFOV) imaging, the entire area of the area detector is the active area so that the repeat pattern has to cover the entire area of the area detector.

The whole digital camera 1230 can be mounted as a scanning stage instead of mounting the area detector on a scanning stage as the specimen moves relative to the area detector. The movement of the specimen relative to the detector can be achieved by mobbing either or both of the area detector and the support or specimen.

For MSIA imaging, it is preferable to use an active area of the detector into an image, an entire strip across the specimen.

For SFOV imaging, the entire area of the detector is used and for imaging the field of view of a stationary microscope, the relative motion of the area detector and the specimen only moving a distance of one repeat pattern, but the entire area of the array is imaged including capturing an image of all of the repeat patterns, no averaging is required with SFOV imaging, but the exposure can be adjusted.

I claim:

1. A scanning microscope for scanning and obtaining a hyperspectral image of at least a portion of a large microscope specimen, the microscope comprising:
    a) an illumination system to illuminate a part of the specimen being scanned;
    b) at least one lens that focuses light from the specimen onto an area detector, the specimen being mounted on a support that is movable relative to the area detector;
    c) the motion of the support being controlled by a computer, the motion of the support being in a direction perpendicular to rows of the area detector;
    d) the area detector having a scan filter array with a repeat pattern of a plurality of rows that is repeated at least across an active area of an entire surface of the area detector, each row of the repeat pattern being covered by a bandpass filter, there being a plurality of repeat patterns and a plurality of bandpass filters having the same bandwidth, each bandpass filter transmitting a narrow spectral range, the bandpass filters forming a hyperspectral filter with a bandwidth that is equal to a sum of the bandwidths of the separate bandpass filters for each of the rows;
    e) the area detector is computer controlled to capture sequential substantially overlapping frame images of the specimen each time that an optical image of the specimen has moved a distance relative to the area detector that is equal to the distance between adjacent rows of the area detector, image data from each new frame image translated in computer memory to match a motion of an optical image across the area detector and added to or averaged with any data previously stored to generate an image of a strip across the specimen, the capturing of frame images continuing until the specimen has moved a relative distance where all object points in that strip have been exposed a number of times equal to a chosen number of active rows in the area detector; and
    f) a final hyperspectral image resulting from the portion of the specimen scanned having a representation of each pixel by a spectrum composed of narrow spectral bands over a continuous spectral range.

2. A method of obtaining a hyperspectral image of at least a portion of a large microscope specimen using a microscope as claimed in claim 1.

3. A scanning microscope for scanning and obtaining a multispectral image of at least a portion of a large microscope specimen, the microscope comprising:
    a) an illumination system to illuminate a part of the specimen being scanned;
    b) at least one lens that focuses light from the specimen onto an area detector, the specimen being mounted on a support that is movable relative to the area detector;
    c) the motion of the support being controlled by a computer, the motion of the support being in a direction perpendicular to rows of the area detector;

d) the specimen containing F fluorophores that are excited by light from the illumination system, the area detector having a scan filter array with a repeat pattern of F rows that is repeated at least across an active area of an entire surface of the area detector, each row of the repeat pattern contains an emission filter for a specific fluorophore, the filter transmitting a spectral range of fluorescence emitted from each pixel position for each of the fluorophores when illuminated by the illumination system with a frequency or range of frequencies chosen to excite some or all of the fluorophores in the specimen, each emission filter transmitting the intensity of the fluorescence emitted, the emission filters forming a multispectral filter;

e) the area detector is computer controlled to capture sequential substantially overlapping frame images of the specimen each time that an optical image of the specimen has moved a distance relative to the area detector that is equal to the distance between adjacent rows of the area detector, image data from each new frame image translated in computer memory to match a motion of an optical image across the area detector and added to or averaged with any data previously stored to generate an image of a strip across the specimen, the capturing of frame images continuing until the specimen has moved a relative distance where all object points in that strip have been exposed a number of times equal to a chosen number of active rows in the area detector; and f) a final multispectral fluorescence image resulting from the portion of the specimen scanned having a representation of each pixel by an intensity of the fluorescence emitted of each of the fluorophores at each pixel position on the specimen.

4. The scanning microscope as claimed in claim 3 where each row of pixels in the repeat pattern is fabricated with an emission filter that matches a known fluorophore of the F fluorophores in the specimen.

5. The scanning microscope as claimed in claim 3 wherein for general purpose imaging, each row of pixels in the repeat pattern of fluorophores is fabricated with an emission filter that matches one of several popular fluorophores.

6. The scanning microscope as claimed in claim 3 where F is an integer in a range of two to seven.

7. A method of obtaining a multispectral image of at least a portion of a large microscope specimen using a microscope as claimed in claim 3.

8. A scanning microscope for scanning and obtaining a hyperspectral image of at least a portion of a large microscope specimen, the microscope comprising:

a) an illumination system to illuminate a part of the specimen being scanned;

b) at least one lens that focuses light from the specimen onto an area detector, the specimen being mounted on a support that is movable relative to the area detector;

c) the motion of the support being controlled by a computer, the motion of the support being in a direction perpendicular to rows of the area detector;

d) the area detector having a scan filter with a repeat pattern of a plurality of rows that is repeated at least across an active area of an entire surface of the area detector, the repeat pattern having at least six rows:

i) three rows of the at least nine rows being RGB rows, one row covered with a red filter, one row covered with a green filter and one row covered with a blue filter;

ii) each of the remaining rows of the at least six rows of the repeat pattern being covered by a bandpass filter, there being a plurality of repeat patterns and a plurality of bandpass filters having the same bandwidth, each bandpass filter transmitting a narrow spectral range, the bandpass filters forming a hyperspectral filter with a bandwidth that is equal to a sum of the bandwidths of the separate bandpass filters for each of the rows;

e) the area detector is computer controlled to capture sequential substantially overlapping frame images of the specimen each time that an optical image of the specimen has moved a distance relative to the area detector that is equal to the distance between adjacent rows of the area detector, image data from each new frame image translated in computer memory to match a motion of an optical image across the area detector and added to or averaged with any data previously stored to generate an image strip across the specimen from images obtained from the bandpass filters, the capturing of frame images continuing until the specimen has moved a relative distance where all object points in that strip have been exposed a number of times equal to a chosen number of active rows in the area detector;

f) the red, green and blue filters enabling RGB imaging of the specimen; and g) a final hyperspectral image resulting from the portion of the specimen scanned having a representation of each pixel by a spectrum composed of narrow spectral bands over a continuous range obtained from the bandpass filters registered with a final RGB image obtained from the RGB imaging.

9. A scanning microscope for scanning and obtaining a multispectral image of at least a portion of a large microscope specimen, the microscope comprising:

a) an illumination system to illuminate a part of the specimen being scanned;

b) at least one lens that focuses light from the specimen onto an area detector, the specimen being mounted on a support that is movable relative to the area detector;

c) the motion of the support being controlled by a computer, the motion of the support being in a direction perpendicular to rows of the area detector;

d) the area detector having a scan filter with a repeat pattern of a plurality of rows that is repeated across at least an active area of an entire surface of the area detector, the repeat pattern having at least five rows:

i) four rows of the at least five rows being RGBW rows, one row covered with a red filter, one row covered with a green filter, one row covered with a blue filter and one row covered with a white filter, the white filter being a clear filter;

ii) the specimen containing at least one fluorophore, each of the remaining rows of the at least five rows of the repeat pattern being covered by an emission filter for a specific fluorophore, there being a plurality of repeat patterns and a plurality of emission filters, the emission filters measuring an intensity of the fluorescence emitted from each pixel position for each of the fluorophores when illuminated by the illumination system with a frequency or range of frequencies chosen to excite some or all of the fluorophores in the specimen, there being one row of the remaining rows of the repeat pattern for each fluorophore, each emission filter transmitting the intensity of the fluorescence emitted, the emission filters forming a multispectral filter;

e) the area detector is computer controlled to capture a frame image of the specimen each time that an optical image of the specimen has moved a distance relative to the area detector that is equal to the distance between adjacent rows of the area detector, image data from each new frame image translated in computer memory to match a motion of an optical image across the area detector and added to or averaged with any data previously stored to generate an image of a strip across the specimen, the capturing of frame images continuing until the specimen has moved a relative distance where all object points in that strip have been exposed a number of times equal to a chosen number of active rows in the area detector; and f) the red, green and blue filters enabling RGB imaging of the specimen and the clear filter enabling greyscale imaging; and g) a final image composed of one or more registered images of a multispectral fluorescence image resulting from the portion of the specimen scanned having a representation of each pixel by an intensity of the fluorescence emitted of each of the fluorophores at each image pixel position on the specimen, and a final RGB image resulting from the RGB imaging registered with a final greyscale image resulting from the greyscale imaging using the clear filter and an additional fluorescence image resulting from an emission filter inserted into optics of the microscope when used with the clear filter.

10. A scanning microscope for scanning and obtaining at least one of a multispectral image and an RGB image of at least a portion of a large microscope specimen, the microscope comprising:

a) an illumination system to illuminate a part of the specimen being scanned;

b) at least one lens that focuses light from the specimen onto an area detector, the specimen being mounted on a support that is movable relative to the area detector;

c) the motion of the support being controlled by a computer, the motion of the support being in a direction perpendicular to rows of the area detector;

d) the area detector having a scan filter that has a repeat pattern of at least four rows with a first set of at least XN rows, with each row being of one colour, N being the number of adjacent rows of the same colour and being equal to or greater than one, X being the number of different colours and being equal to or greater than three, at least three of the colours being red, green and blue, and a second set of at least one row of the at least four rows of the repeat pattern containing an emission filter for a specific fluorophore, the emission filter transmitting a spectral range of fluorescence for each pixel position for at least one fluorophore illuminated by the illumination system with a frequency or range of frequencies chosen to excite the at least one fluorophore in the specimen, there being one emission filter and one row of the second set of the area detector for each fluorophore of the specimen, each emission filter transmitting the intensity of the florescence emitted, the at least one emission filter forming a multispectral filter that transmit a range of wavelengths chosen to match emission spectra of fluorophores in which there are two rows of the second set of at least six rows for each fluorophore;

e) the area detector is computer controlled to capture frame image of the specimen each time that an image of the specimen has moved a distance relative to the area detector that is equal to the distance between adjacent rows of the area detector, image data from each new frame image translated in computer memory to match a motion of an optical image across the area detector and added to or averaged with any data previously stored to generate an image of a strip across the specimen, the capturing of frame images continuing until the specimen has moved a relative distance where all object points in that strip have been exposed a number of times equal to a chosen number of active rows in the area detector;

f) the red, green and blue filters enabling RGB imaging of the specimen; and g) a final image composed of one or more registered images of a multispectral fluorescence image resulting from the portion of the specimen scanned having a representation of each pixel by an intensity of the fluorescence emitted of each of the fluorophores, and a final RGB image of the specimen resulting from the RGB imaging.

11. A scanning microscope for scanning and obtaining one or more of Moving Specimen Image Averaging (MSIA) and Single Field Of View (SFOV) images hyperspectral and multispectral images of at least a portion of a large microscope specimen, the microscope comprising:

a) an illumination system to illuminate a part of the specimen being scanned;

b) at least one lens that focuses light from the specimen onto an area detector, the specimen being mounted on a support, relative motion between the support and the area detector controlled by a computer;

c) the relative motion between the support and the area detector controlled by a computer the relative motion being in a direction perpendicular to rows of the area detector, comprising one or more images of a specimen of hyperspectral, multispectral, RGB, RGBW and W;

d) the area detector having a scan filter that substantially covers an entire area of the area detector with a repeat pattern having at least three rows and an active area having at least six rows, the scan filter having a format of wherein there are successive diagonal rows of red, green, blue, and/or white, where white is a clear filter, and/or diagonal fluorescence and/or hyperspectral filters;

e) during MSIA imaging, the area detector is computer controlled to capture a frame image of the specimen each time that an optical image of the specimen is moved a distance relative to the area detector that is equal to the distance between adjacent rows of the area detector, image data from each new frame image translated in computer memory to match a motion of an optical image across the area detector and added to or averaged with any data previously stored to generate an image of a strip across the specimen, the capturing of frame images continuing until the specimen has moved a relative distance so that data in the colour strip images opposite a last row of the active area of the area detector is completely exposed and is exposed a number of times equal to a number of rows in the active area of the area detector divided by the number of rows in the repeat pattern;

f) during SFOV imaging, the area detector is computer controlled to capture an SFOV frame image of the specimen each time that an optical image of the specimen is moved a distance relative to the area detector that is equal to the distance between adjacent rows of the area detector, the relative movement between the area detector and the specimen stopping as each SFOV image is taken, there being one frame image for each row of the repeat pattern and any repetitions of the repeat pattern;

g) the red, green and blue filters enabling RGB imaging of the specimen, the red, green, blue and/or white filters enabling RGB imaging or greyscale imaging respectively; and h) a final image composed of one or more registered images of a hyperspectral image, a multispectral fluorescence image an RGB image, an RGBW image and a W image resulting from the portion of the specimen scanned.

12. A digital scanning single field of view camera for use on an optical microscope comprising a scanning filter array for one or more of multispectral, hyperspectral or including RGB, and/or RGBW, and/or W rows, the scanning filter array having a repeat pattern that covers substantially an entire area of an area detector, the area detector adapted for movement across a specimen, the area detector with the scanning filter array is mounted on a scanning stage relative to the area detector, and a computer programmed to control a movement of the scanning stage, to acquire one frame image for each row in a repeat pattern as the scan proceeds, to assemble frame images for each colour in the repeat pattern, and, when the scan is complete, to produce a final image that is one or more of a multispectral image, a hyperspectral image, an RGB image, an RGBW image, a W image and a SFOV image.

13. The camera as claimed in claim 12 wherein the computer is controlled to stop at each image position when an SFOV image is captured and for each image captured an exposure is adjustable by the computer for each image and each type of image that is captured.

14. The camera as claimed in claim 12 wherein the camera is mounted directly on a camera port of the optical microscope.

* * * * *